(12) United States Patent
Konrardy et al.

(10) Patent No.: US 9,940,834 B1
(45) Date of Patent: Apr. 10, 2018

(54) AUTONOMOUS VEHICLE APPLICATION

(71) Applicant: STATE FARM MUTUAL AUTOMOBILE INSURANCE COMPANY, Bloomington, IL (US)

(72) Inventors: Blake Konrardy, Bloomington, IL (US); Scott T. Christensen, Salem, OR (US); Gregory Hayward, Bloomington, IL (US); Scott Farris, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/409,115

(22) Filed: Jan. 18, 2017

Related U.S. Application Data

(60) Provisional application No. 62/434,359, filed on Dec. 14, 2016, provisional application No. 62/434,355, (Continued)

(51) Int. Cl.
*G08G 1/09* (2006.01)
*G08G 1/0967* (2006.01)
*G08G 1/16* (2006.01)

(52) U.S. Cl.
CPC ....... *G08G 1/096725* (2013.01); *G08G 1/161* (2013.01); *G08G 1/165* (2013.01); *G08G 1/166* (2013.01)

(58) Field of Classification Search
CPC .......... G06Q 40/08; G08G 1/0967–1/096791; G08G 1/0968–1/096827; G08G 1/161;
(Continued)

(56) References Cited

U.S. PATENT DOCUMENTS 4,218,763 A 8/1980 Kelley et al.
4,565,997 A 1/1986 Seko et al.
(Continued)

FOREIGN PATENT DOCUMENTS

EP 700009 A2 3/1996
GB 2268608 A 1/1994
(Continued)

OTHER PUBLICATIONS

"Driverless Cars . . . The Future is Already Here", AutoInsurance Center, downloaded from the Internet at: <http://www.autoinsurancecenter.com/driverless-cars . . . the-future-is-already-here.htm> (2010; downloaded on Mar. 27, 2014).
(Continued)

*Primary Examiner* — Thomas Mullen
(74) *Attorney, Agent, or Firm* — Marshall, Gerstein & Borun LLP; Randall G. Rueth

(57) ABSTRACT

Methods and systems for communicating between autonomous vehicles are described herein. Such communication may be performed for signaling, collision avoidance, path coordination, and/or autonomous control. A computing device may receive communications from autonomous vehicles, where the communications include data for the same road segment, including an indication of a condition of the road segment. The computing device may combine the data for the same road segment to generate an overall indication of the condition of the road segment, which may include a recommendation to vehicles approaching the road segment. Additionally, the computing device may receive a request from a mobile device within a vehicle approaching the road segment to display vehicle data. The overall indication for the road segment may then be displayed on a user interface of the mobile device.

20 Claims, 9 Drawing Sheets

Related U.S. Application Data filed on Dec. 14, 2016, provisional application No. 62/434,361, filed on Dec. 14, 2016, provisional application No. 62/434,370, filed on Dec. 14, 2016, provisional application No. 62/434,367, filed on Dec. 14, 2016, provisional application No. 62/434,365, filed on Dec. 14, 2016, provisional application No. 62/430,215, filed on Dec. 5, 2016, provisional application No. 62/428,843, filed on Dec. 1, 2016, provisional application No. 62/424,078, filed on Nov. 18, 2016, provisional application No. 62/424,093, filed on Nov. 18, 2016, provisional application No. 62/419,017, filed on Nov. 8, 2016, provisional application No. 62/418,999, filed on Nov. 8, 2016, provisional application No. 62/419,009, filed on Nov. 8, 2016, provisional application No. 62/418,988, filed on Nov. 8, 2016, provisional application No. 62/419,023, filed on Nov. 8, 2016, provisional application No. 62/419,002, filed on Nov. 8, 2016, provisional application No. 62/415,672, filed on Nov. 1, 2016, provisional application No. 62/415,668, filed on Nov. 1, 2016, provisional application No. 62/415,678, filed on Nov. 1, 2016, provisional application No. 62/415,673, filed on Nov. 1, 2016, provisional application No. 62/406,605, filed on Oct. 11, 2016, provisional application No. 62/406,600, filed on Oct. 11, 2016, provisional application No. 62/406,595, filed on Oct. 11, 2016, provisional application No. 62/406,611, filed on Oct. 11, 2016, provisional application No. 62/381,848, filed on Aug. 31, 2016, provisional application No. 62/380,686, filed on Aug. 29, 2016, provisional application No. 62/376,044, filed on Aug. 17, 2016, provisional application No. 62/373,084, filed on Aug. 10, 2016, provisional application No. 62/351,559, filed on Jun. 17, 2016, provisional application No. 62/349,884, filed on Jun. 14, 2016, provisional application No. 62/312,108, filed on Mar. 23, 2016, provisional application No. 62/303,500, filed on Mar. 4, 2016, provisional application No. 62/302,990, filed on Mar. 3, 2016, provisional application No. 62/287,659, filed on Jan. 27, 2016, provisional application No. 62/286,017, filed on Jan. 22, 2016.

(58) Field of Classification Search
CPC ........ G08G 1/165; G08G 1/166; G01C 21/26; G01C 21/3415
USPC .................. 340/901, 905; 701/300, 301, 400, 701/408–411, 415, 418, 419; 705/4
See application file for complete search history.

(56) References Cited

U.S. PATENT DOCUMENTS

| | | |
|---|---|---|
| 5,367,456 A | 11/1994 | Summerville et al. |
| 5,368,484 A | 11/1994 | Copperman et al. |
| 5,436,839 A | 7/1995 | Dausch et al. |
| 5,499,182 A | 3/1996 | Ousborne |
| 5,515,026 A | 5/1996 | Ewert |
| 5,626,362 A | 5/1997 | Mottola |
| 5,797,134 A | 8/1998 | McMillan et al. |
| 5,835,008 A | 11/1998 | Colemere, Jr. |
| 5,983,161 A | 11/1999 | Lemelson et al. |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | MacKey et al. |
| 6,246,933 B1 | 6/2001 | Bague |
| 6,253,129 B1 | 6/2001 | Jenkins et al. |
| 6,285,931 B1 | 9/2001 | Hattori et al. |
| 6,298,290 B1 | 10/2001 | Abe et al. |
| 6,313,749 B1 | 11/2001 | Horne et al. |
| 6,400,835 B1 | 6/2002 | Lemelson et al. |
| 6,473,000 B1 | 10/2002 | Secreet et al. |
| 6,477,117 B1 | 11/2002 | Narayanaswami et al. |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,661,345 B1 | 12/2003 | Bevan et al. |
| 6,704,434 B1 | 3/2004 | Sakoh et al. |
| 6,795,759 B2 | 9/2004 | Doyle |
| 6,832,141 B2 | 12/2004 | Skeen et al. |
| 6,909,947 B2 | 6/2005 | Douros et al. |
| 6,934,365 B2 | 8/2005 | Suganuma et al. |
| 6,989,737 B2 | 1/2006 | Yasui |
| 7,027,621 B1 | 4/2006 | Prokoski |
| 7,054,723 B2 | 5/2006 | Seto et al. |
| 7,138,922 B2 | 11/2006 | Strumolo et al. |
| 7,149,533 B2 | 12/2006 | Laird et al. |
| 7,253,724 B2 | 8/2007 | Prakah-Asante et al. |
| 7,254,482 B2 | 8/2007 | Kawasaki et al. |
| 7,302,344 B2 | 11/2007 | Olney et al. |
| 7,315,233 B2 | 1/2008 | Yuhara |
| 7,330,124 B2 | 2/2008 | Ota |
| 7,356,392 B2 | 4/2008 | Hubbard et al. |
| 7,386,376 B2 | 6/2008 | Basir et al. |
| 7,424,414 B2 | 9/2008 | Craft |
| 7,565,230 B2 | 7/2009 | Gardner et al. |
| 7,609,150 B2 | 10/2009 | Wheatley et al. |
| 7,639,148 B2 | 12/2009 | Victor |
| 7,692,552 B2 | 4/2010 | Harrington et al. |
| 7,719,431 B2 | 5/2010 | Bolourchi |
| 7,783,505 B2 | 8/2010 | Roschelle et al. |
| 7,792,328 B2 | 9/2010 | Albertson et al. |
| 7,812,712 B2 | 10/2010 | White et al. |
| 7,835,834 B2 | 11/2010 | Smith et al. |
| 7,865,378 B2 | 1/2011 | Gay |
| 7,870,010 B2 | 1/2011 | Joao |
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,979,172 B2 | 7/2011 | Breed |
| 7,979,173 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach et al. |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,090,598 B2 | 1/2012 | Bauer et al. |
| 8,095,394 B2 | 1/2012 | Nowak et al. |
| 8,117,049 B2 | 2/2012 | Berkobin et al. |
| 8,140,358 B1 | 3/2012 | Ling et al. |
| 8,140,359 B2 | 3/2012 | Daniel |
| 8,180,522 B2 | 5/2012 | Tuff |
| 8,180,655 B1 | 5/2012 | Hopkins, III |
| 8,185,380 B2 | 5/2012 | Kameyama |
| 8,188,887 B2 | 5/2012 | Catten et al. |
| 8,190,323 B2 | 5/2012 | Maeda et al. |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III et al. |
| 8,265,861 B2 | 9/2012 | Ikeda et al. |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery et al. |
| 8,364,391 B2 | 1/2013 | Nagase et al. |
| 8,384,534 B2 | 2/2013 | James et al. |
| 8,386,168 B2 | 2/2013 | Hao |

(56) References Cited

U.S. PATENT DOCUMENTS

| | | |
|---|---|---|
| 8,423,239 B2 | 4/2013 | Blumer et al. |
| 8,447,231 B2 | 5/2013 | Bai et al. |
| 8,451,105 B2 | 5/2013 | McNay |
| 8,457,880 B1 | 6/2013 | Malalur et al. |
| 8,473,143 B2 | 6/2013 | Stark et al. |
| 8,487,775 B2 | 7/2013 | Victor et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |
| 8,645,014 B1 | 2/2014 | Kozlowski et al. |
| 8,645,029 B2 | 2/2014 | Kim et al. |
| 8,698,639 B2 | 4/2014 | Fung et al. |
| 8,700,251 B1 | 4/2014 | Zhu et al. |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier et al. |
| 8,816,836 B2 | 8/2014 | Lee et al. |
| 8,849,558 B2 | 9/2014 | Morotomi et al. |
| 8,876,535 B2 | 11/2014 | Fields et al. |
| 8,880,291 B2 | 11/2014 | Hampiholi |
| 8,954,226 B1 | 2/2015 | Binion et al. |
| 8,965,677 B2 | 2/2015 | Breed et al. |
| 9,019,092 B1 | 4/2015 | Brandmaier et al. |
| 9,049,584 B2 | 6/2015 | Hatton |
| 9,053,588 B1 | 6/2015 | Briggs et al. |
| 9,056,395 B1 | 6/2015 | Ferguson et al. |
| 9,070,243 B1 | 6/2015 | Kozlowski et al. |
| 9,079,587 B1 | 7/2015 | Rupp et al. |
| 9,135,803 B1 | 9/2015 | Fields et al. |
| 9,141,996 B2 | 9/2015 | Christensen et al. |
| 9,147,219 B2 | 9/2015 | Binion et al. |
| 9,147,353 B1 | 9/2015 | Slusar |
| 9,164,507 B2 | 10/2015 | Cheatham, III et al. |
| 9,262,787 B2 | 2/2016 | Binion et al. |
| 9,274,525 B1 | 3/2016 | Ferguson et al. |
| 9,275,417 B2 | 3/2016 | Binion et al. |
| 9,275,552 B1 | 3/2016 | Fields et al. |
| 9,282,430 B1 | 3/2016 | Brandmaier et al. |
| 9,282,447 B2 | 3/2016 | Gianakis |
| 9,299,108 B2 | 3/2016 | Diana et al. |
| 9,317,983 B2 | 4/2016 | Ricci |
| 9,342,993 B1 | 5/2016 | Fields et al. |
| 9,352,709 B2 | 5/2016 | Brenneis et al. |
| 9,355,423 B1 | 5/2016 | Slusar |
| 9,361,650 B2 | 6/2016 | Binion et al. |
| 9,376,090 B2 | 6/2016 | Gennermann |
| 9,377,315 B2 | 6/2016 | Grover et al. |
| 9,384,491 B1 | 7/2016 | Briggs et al. |
| 9,390,451 B1 | 7/2016 | Slusar |
| 9,421,972 B2 | 8/2016 | Davidsson et al. |
| 9,429,943 B2 | 8/2016 | Wilson et al. |
| 9,430,944 B2 | 8/2016 | Grimm et al. |
| 9,454,786 B1 | 9/2016 | Srey et al. |
| 9,466,214 B2 | 10/2016 | Fuehrer |
| 9,505,494 B1 | 11/2016 | Marlow et al. |
| 9,511,765 B2 | 12/2016 | Obradovich |
| 9,567,007 B2 | 2/2017 | Cudak et al. |
| 2001/0005217 A1 | 6/2001 | Hamilton et al. |
| 2002/0016655 A1 | 2/2002 | Joao |
| 2002/0111725 A1 | 8/2002 | Burge |
| 2002/0116228 A1 | 8/2002 | Bauer et al. |
| 2002/0128882 A1 | 9/2002 | Nakagawa et al. |
| 2002/0146667 A1 | 10/2002 | Dowdell et al. |
| 2003/0028298 A1 | 2/2003 | MacKy et al. |
| 2003/0061160 A1 | 3/2003 | Asahina |
| 2003/0200123 A1 | 10/2003 | Burge et al. |
| 2004/0005927 A1 | 1/2004 | Bonilla et al. |
| 2004/0017106 A1 | 1/2004 | Aizawa et al. |
| 2004/0039503 A1 | 2/2004 | Doyle |
| 2004/0054452 A1 | 3/2004 | Bjorkman |
| 2004/0077285 A1 | 4/2004 | Bonilla et al. |
| 2004/0085198 A1 | 5/2004 | Saito et al. |
| 2004/0090334 A1 | 5/2004 | Zhang et al. |
| 2004/0111301 A1 | 6/2004 | Wahlbin et al. |
| 2004/0122639 A1 | 6/2004 | Qiu |
| 2004/0139034 A1 | 7/2004 | Farmer |
| 2004/0153362 A1 | 8/2004 | Bauer et al. |
| 2004/0158476 A1 | 8/2004 | Blessinger et al. |
| 2004/0198441 A1 | 10/2004 | Cooper et al. |
| 2004/0226043 A1 | 11/2004 | Mettu et al. |
| 2004/0260579 A1 | 12/2004 | Tremiti |
| 2005/0073438 A1 | 4/2005 | Rodgers et al. |
| 2005/0108910 A1 | 5/2005 | Esparza et al. |
| 2005/0131597 A1 | 6/2005 | Raz et al. |
| 2005/0228763 A1 | 10/2005 | Lewis et al. |
| 2005/0259151 A1 | 11/2005 | Hamilton et al. |
| 2005/0267784 A1 | 12/2005 | Slen et al. |
| 2006/0031103 A1 | 2/2006 | Henry |
| 2006/0052909 A1 | 3/2006 | Cherouny |
| 2006/0053038 A1 | 3/2006 | Warren et al. |
| 2006/0079280 A1 | 4/2006 | LaPerch |
| 2006/0092043 A1 | 5/2006 | Lagassey |
| 2006/0136291 A1 | 6/2006 | Morita et al. |
| 2006/0184295 A1 | 8/2006 | Hawkins et al. |
| 2006/0212195 A1 | 9/2006 | Veith et al. |
| 2006/0220905 A1 | 10/2006 | Hovestadt |
| 2006/0229777 A1 | 10/2006 | Hudson et al. |
| 2006/0232430 A1 | 10/2006 | Takaoka et al. |
| 2007/0001831 A1 | 1/2007 | Raz et al. |
| 2007/0027726 A1 | 2/2007 | Warren et al. |
| 2007/0055422 A1 | 3/2007 | Anzai et al. |
| 2007/0080816 A1 | 4/2007 | Haque et al. |
| 2007/0088469 A1 | 4/2007 | Schmiedel et al. |
| 2007/0122771 A1 | 5/2007 | Maeda et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0219720 A1 | 9/2007 | Trepagnier et al. |
| 2007/0282638 A1 | 12/2007 | Surovy |
| 2007/0291130 A1 | 12/2007 | Broggi et al. |
| 2007/0299700 A1 | 12/2007 | Gay et al. |
| 2008/0027761 A1 | 1/2008 | Bracha |
| 2008/0052134 A1 | 2/2008 | Nowak et al. |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0082372 A1 | 4/2008 | Burch |
| 2008/0084473 A1 | 4/2008 | Romanowich |
| 2008/0106390 A1 | 5/2008 | White |
| 2008/0111666 A1 | 5/2008 | Plante et al. |
| 2008/0114502 A1 | 5/2008 | Breed et al. |
| 2008/0126137 A1 | 5/2008 | Kidd et al. |
| 2008/0143497 A1 | 6/2008 | Wasson et al. |
| 2008/0147266 A1 | 6/2008 | Plante et al. |
| 2008/0147267 A1 | 6/2008 | Plante et al. |
| 2008/0180237 A1 | 7/2008 | Fayyad et al. |
| 2008/0189142 A1 | 8/2008 | Brown et al. |
| 2008/0255887 A1 | 10/2008 | Gruter |
| 2008/0255888 A1 | 10/2008 | Berkobin et al. |
| 2008/0258890 A1 | 10/2008 | Follmer et al. |
| 2008/0291008 A1 | 11/2008 | Jeon |
| 2008/0297488 A1 | 12/2008 | Operowsky et al. |
| 2008/0319665 A1 | 12/2008 | Berkobin et al. |
| 2009/0015684 A1 | 1/2009 | Ooga et al. |
| 2009/0063030 A1 | 3/2009 | Howarter et al. |
| 2009/0069953 A1 | 3/2009 | Hale et al. |
| 2009/0079839 A1 | 3/2009 | Fischer et al. |
| 2009/0115638 A1 | 5/2009 | Shankwitz et al. |
| 2009/0132294 A1 | 5/2009 | Haines |
| 2009/0207005 A1 | 8/2009 | Habetha et al. |
| 2009/0210257 A1 | 8/2009 | Chalfant et al. |
| 2009/0267801 A1 | 10/2009 | Kawai et al. |
| 2009/0300065 A1 | 12/2009 | Birchall |
| 2009/0303026 A1 | 12/2009 | Broggi et al. |
| 2010/0004995 A1 | 1/2010 | Hickman |
| 2010/0030540 A1 | 2/2010 | Choi et al. |
| 2010/0030586 A1 | 2/2010 | Taylor et al. |
| 2010/0055649 A1 | 3/2010 | Takahashi et al. |
| 2010/0076646 A1 | 3/2010 | Basir et al. |
| 2010/0106356 A1 | 4/2010 | Trepagnier et al. |

(56) References Cited

U.S. PATENT DOCUMENTS

| | | |
|---|---|---|
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1 | 5/2010 | Collopy et al. |
| 2010/0131307 A1 | 5/2010 | Collopy et al. |
| 2010/0214087 A1 | 8/2010 | Nakagoshi et al. |
| 2010/0219944 A1 | 9/2010 | Mc Cormick et al. |
| 2010/0293033 A1 | 11/2010 | Hall et al. |
| 2010/0299021 A1 | 11/2010 | Jalili |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0087505 A1 | 4/2011 | Terlep |
| 2011/0090075 A1 | 4/2011 | Armitage et al. |
| 2011/0090093 A1 | 4/2011 | Grimm et al. |
| 2011/0093350 A1 | 4/2011 | Laumeyer et al. |
| 2011/0106370 A1 | 5/2011 | Duddle et al. |
| 2011/0133954 A1 | 6/2011 | Ooshima et al. |
| 2011/0137684 A1 | 6/2011 | Peak et al. |
| 2011/0140968 A1 | 6/2011 | Bai et al. |
| 2011/0153367 A1 | 6/2011 | Amigo et al. |
| 2011/0169625 A1 | 7/2011 | James et al. |
| 2011/0184605 A1 | 7/2011 | Neff |
| 2011/0196571 A1 | 8/2011 | Foladare et al. |
| 2011/0202305 A1 | 8/2011 | Willis et al. |
| 2011/0295446 A1 | 12/2011 | Basir et al. |
| 2011/0301839 A1 | 12/2011 | Pudar et al. |
| 2011/0304465 A1 | 12/2011 | Boult et al. |
| 2011/0307188 A1 | 12/2011 | Peng et al. |
| 2012/0004933 A1 | 1/2012 | Foladare et al. |
| 2012/0010906 A1 | 1/2012 | Foladare et al. |
| 2012/0025969 A1 | 2/2012 | Dozza |
| 2012/0028680 A1 | 2/2012 | Breed |
| 2012/0066007 A1 | 3/2012 | Ferrick et al. |
| 2012/0071151 A1 | 3/2012 | Abramson et al. |
| 2012/0072243 A1 | 3/2012 | Collins et al. |
| 2012/0072244 A1 | 3/2012 | Collins et al. |
| 2012/0083668 A1 | 4/2012 | Pradeep et al. |
| 2012/0083960 A1 | 4/2012 | Zhu et al. |
| 2012/0083974 A1 | 4/2012 | Sandblom |
| 2012/0092157 A1 | 4/2012 | Tran |
| 2012/0101855 A1 | 4/2012 | Collins et al. |
| 2012/0108909 A1 | 5/2012 | Slobounov et al. |
| 2012/0109407 A1 | 5/2012 | Yousefi et al. |
| 2012/0109692 A1 | 5/2012 | Collins et al. |
| 2012/0123806 A1 | 5/2012 | Schumann, Jr. et al. |
| 2012/0135382 A1 | 5/2012 | Winston et al. |
| 2012/0143630 A1 | 6/2012 | Hertenstein |
| 2012/0172055 A1 | 7/2012 | Edge |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0197669 A1 | 8/2012 | Kote et al. |
| 2012/0209634 A1 | 8/2012 | Ling et al. |
| 2012/0215375 A1 | 8/2012 | Chang |
| 2012/0235865 A1 | 9/2012 | Nath et al. |
| 2012/0239471 A1 | 9/2012 | Grimm et al. |
| 2012/0246733 A1 | 9/2012 | Schafer et al. |
| 2012/0258702 A1 | 10/2012 | Matsuyama |
| 2012/0277950 A1 | 11/2012 | Plante et al. |
| 2012/0303222 A1 | 11/2012 | Cooprider et al. |
| 2012/0316406 A1 | 12/2012 | Rahman et al. |
| 2013/0006674 A1 | 1/2013 | Bowne et al. |
| 2013/0006675 A1 | 1/2013 | Bowne et al. |
| 2013/0018677 A1 | 1/2013 | Chevrette |
| 2013/0038437 A1 | 2/2013 | Talati et al. |
| 2013/0044008 A1 | 2/2013 | Gafford et al. |
| 2013/0046562 A1 | 2/2013 | Taylor et al. |
| 2013/0073115 A1 | 3/2013 | Levin et al. |
| 2013/0116855 A1 | 5/2013 | Nielsen et al. |
| 2013/0144459 A1 | 6/2013 | Ricci |
| 2013/0151202 A1 | 6/2013 | Denny et al. |
| 2013/0164715 A1 | 6/2013 | Hunt et al. |
| 2013/0179198 A1 | 7/2013 | Bowne et al. |
| 2013/0189649 A1 | 7/2013 | Mannino |
| 2013/0209968 A1 | 8/2013 | Miller et al. |
| 2013/0218603 A1 | 8/2013 | Hagelstein et al. |
| 2013/0218604 A1 | 8/2013 | Hagelstein et al. |
| 2013/0227409 A1 | 8/2013 | Das et al. |
| 2013/0231824 A1 | 9/2013 | Wilson et al. |
| 2013/0245881 A1 | 9/2013 | Scarbrough |
| 2013/0267194 A1 | 10/2013 | Breed |
| 2013/0289819 A1 | 10/2013 | Hassib et al. |
| 2013/0302758 A1 | 11/2013 | Wright |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317693 A1 | 11/2013 | Jefferies et al. |
| 2013/0317711 A1 | 11/2013 | Plante |
| 2013/0317865 A1 | 11/2013 | Tofte et al. |
| 2013/0332402 A1 | 12/2013 | Rakshit |
| 2013/0339062 A1 | 12/2013 | Brewer et al. |
| 2014/0002651 A1 | 1/2014 | Plante |
| 2014/0009307 A1 | 1/2014 | Bowers et al. |
| 2014/0012492 A1 | 1/2014 | Bowers et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel et al. |
| 2014/0052336 A1 | 2/2014 | Moshchuk et al. |
| 2014/0058761 A1 | 2/2014 | Freiberger et al. |
| 2014/0059066 A1 | 2/2014 | Koloskov |
| 2014/0070980 A1 | 3/2014 | Park |
| 2014/0080100 A1 | 3/2014 | Phelan et al. |
| 2014/0095214 A1 | 4/2014 | Mathe et al. |
| 2014/0099607 A1 | 4/2014 | Armitage et al. |
| 2014/0100892 A1 | 4/2014 | Collopy et al. |
| 2014/0106782 A1 | 4/2014 | Chitre et al. |
| 2014/0108198 A1 | 4/2014 | Jariyasunant et al. |
| 2014/0114691 A1 | 4/2014 | Pearce |
| 2014/0125474 A1 | 5/2014 | Gunaratne |
| 2014/0167967 A1 | 6/2014 | He et al. |
| 2014/0168399 A1 | 6/2014 | Plummer et al. |
| 2014/0172467 A1 | 6/2014 | He et al. |
| 2014/0172727 A1 | 6/2014 | Abhyanker et al. |
| 2014/0191858 A1 | 7/2014 | Morgan et al. |
| 2014/0218187 A1 | 8/2014 | Chun et al. |
| 2014/0236638 A1 | 8/2014 | Pallesen et al. |
| 2014/0240132 A1 | 8/2014 | Bychkov |
| 2014/0253376 A1 | 9/2014 | Large et al. |
| 2014/0257866 A1 | 9/2014 | Gay et al. |
| 2014/0272810 A1 | 9/2014 | Fields et al. |
| 2014/0277916 A1 | 9/2014 | Mullen et al. |
| 2014/0278840 A1 | 9/2014 | Scofield et al. |
| 2014/0279707 A1 | 9/2014 | Joshua et al. |
| 2014/0301218 A1 | 10/2014 | Luo et al. |
| 2014/0309864 A1 | 10/2014 | Ricci |
| 2014/0310186 A1 | 10/2014 | Ricci |
| 2014/0358324 A1 | 12/2014 | Sagar et al. |
| 2015/0024705 A1 | 1/2015 | Rashidi |
| 2015/0051752 A1 | 2/2015 | Paszkowicz |
| 2015/0070265 A1 | 3/2015 | Cruz-Hernandez et al. |
| 2015/0073645 A1 | 3/2015 | Davidsson et al. |
| 2015/0088334 A1 | 3/2015 | Bowers et al. |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0120331 A1 | 4/2015 | Russo et al. |
| 2015/0127570 A1 | 5/2015 | Doughty et al. |
| 2015/0142262 A1 | 5/2015 | Lee |
| 2015/0149265 A1 | 5/2015 | Huntzicker et al. |
| 2015/0158469 A1 | 6/2015 | Cheatham, III et al. |
| 2015/0158495 A1 | 6/2015 | Duncan et al. |
| 2015/0160653 A1 | 6/2015 | Cheatham, III et al. |
| 2015/0161893 A1 | 6/2015 | Duncan et al. |
| 2015/0161894 A1 | 6/2015 | Duncan et al. |
| 2015/0166069 A1 | 6/2015 | Engelman et al. |

(56) References Cited

U.S. PATENT DOCUMENTS

| | | | |
|---|---|---|---|
| 2015/0170287 A1 | 6/2015 | Tirone et al. |
| 2015/0170522 A1 | 6/2015 | Noh |
| 2015/0178998 A1 | 6/2015 | Attard et al. |
| 2015/0185034 A1 | 7/2015 | Abhyanker |
| 2015/0187013 A1 | 7/2015 | Adams et al. |
| 2015/0187015 A1 | 7/2015 | Adams et al. |
| 2015/0187016 A1 | 7/2015 | Adams et al. |
| 2015/0235557 A1 | 8/2015 | Engelman et al. |
| 2015/0241241 A1 | 8/2015 | Cudak et al. |
| 2015/0242953 A1 | 8/2015 | Suiter |
| 2015/0254955 A1 | 9/2015 | Fields et al. |
| 2015/0294422 A1 | 10/2015 | Carver et al. |
| 2015/0310742 A1 | 10/2015 | Albornoz |
| 2015/0348337 A1 | 12/2015 | Choi |
| 2016/0027276 A1 | 1/2016 | Freeck et al. |
| 2016/0036899 A1 | 2/2016 | Moody et al. |
| 2016/0086285 A1 | 3/2016 | Peters et al. |
| 2016/0092962 A1 | 3/2016 | Wasserman et al. |
| 2016/0093212 A1 | 3/2016 | Barfield, Jr. et al. |
| 2016/0105365 A1 | 4/2016 | Droste et al. |
| 2016/0116293 A1 | 4/2016 | Grover et al. |
| 2016/0189544 A1 | 6/2016 | Ricci |
| 2016/0264132 A1 | 9/2016 | Paul et al. |
| 2016/0277911 A1 | 9/2016 | Kang et al. |
| 2016/0288833 A1 | 10/2016 | Heimberger et al. |
| 2016/0327949 A1 | 11/2016 | Wilson et al. |
| 2016/0370194 A1 | 12/2016 | Colijn et al. |
| 2017/0066452 A1* | 3/2017 | Scofield ........... G08G 1/096725 |

FOREIGN PATENT DOCUMENTS

| | | |
|---|---|---|
| GB | 2494727 A | 3/2013 |
| JP | 2002-259708 A | 9/2002 |
| WO | WO-2005/083605 A1 | 9/2005 |
| WO | WO-2010/034909 A1 | 4/2010 |
| WO | WO-2014/139821 A1 | 9/2014 |
| WO | WO-2014/148976 A1 | 9/2014 |
| WO | WO-2016/156236 A1 | 10/2016 |

OTHER PUBLICATIONS

"Integrated Vehicle-Based Safety Systems (IVBSS)", Research and Innovative Technology Administration (RITA), http://www.its.dot.gov/ivbss/, retrieved from the internet on Nov. 4, 2013, 3 pages.

"Linking Driving Behavior to Automobile Accidents and Insurance Rates: An Analysis of Five Billion Miles Driven", Progressive Insurance brochure (Jul. 2012).

"Self-Driving Cars: The Next Revolution", KPMG, Center for Automotive Research (2012).

37 The Influence of Telematics on Customer Experience: Case Study of Progressive's Snapshot Program, J.D. Power Insights, McGraw Hill Financial (2013).

Alberi et al., A proposed standardized testing procedure for autonomous ground vehicles, Virginia Polytechnic Institute and State University, 63 pages (Apr. 29, 2008).

Broggi et al., Extensive Tests of Autonomous Driving Technologies, IEEE Trans on Intelligent Transportation Systems, 14(3):1403-15 (May 30, 2013).

Campbell et al., Autonomous Driving in Urban Environments: Approaches, Lessons, and Challenges, Phil. Trans. R. Soc. A, 368:4649-72 (2010).

Carroll et al. "Where Innovation is Sorely Needed", http://www.technologyreview.com/news/422568/where-innovation-is-sorely-needed/?nlid, retrieved from the internet on Nov. 4, 2013, 3 pages.

Davies, Avoiding Squirrels and Other Things Google's Robot Car Can't Do, downloaded from the Internet at: <http://www.wired.com/2014/05/google-self-driving-car-can-cant/ (downloaded on May 28, 2014).

Figueiredo et al., An Approach to Simulate Autonomous Vehicles in Urban Traffic Scenarios, University of Porto, 7 pages (Nov. 2009).

Gechter et al., Towards a Hybrid Real/Virtual Simulation of Autonomous Vehicles for Critical Scenarios, International Academy Research and Industry Association (IARIA), 4 pages (2014).

Hancock et al., "The Impact of Emotions and Predominant Emotion Regulation Technique on Driving Performance," pp. 5882-5885 (2012).

Hars, Autonomous Cars: The Next Revolution Looms, Inventivio GmbH, 4 pages (Jan. 2010).

Lee et al., Autonomous Vehicle Simulation Project, Int. J. Software Eng. and Its Applications, 7(5):393-402 (2013).

Levendusky, Advancements in automotive technology and their effect on personal auto insurance, downloaded from the Internet at: <http://www.verisk.com/visualize/advancements-in-automotive-technology-and-their-effect> (2013).

McCraty et al., "The Effects of Different Types of Music on Mood, Tension, and Mental Clarity." Alternative Therapies in Health and Medicine 4.1 (1998): 75-84. NCBI PubMed. Web. Jul. 11, 2013.

Miller, A simulation and regression testing framework for autonomous workers, Case Western Reserve University, 12 pages (Aug. 2007).

Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).

Pereira, An Integrated Architecture for Autonomous Vehicle Simulation, University of Porto., 114 pages (Jun. 2011).

Quinlan et al., Bringing Simulation to Life: A Mixed Reality Autonomous Intersection, Proc. IROS 2010—IEEE/RSJ International Conference on Intelligent Robots and Systems, Taipei Taiwan, 6 pages (Oct. 2010).

Read, Autonomous cars & the death of auto insurance, downloaded from the Internet at: <http://www.thecarconnection.com/news/1083266_autonomous-cars-the-death-of-auto-insurance> (Apr. 1, 2013).

Reddy, 37 The New Auto Insurance Ecosystem: Telematics, Mobility and the Connected Car, Cognizant (Aug. 2012).

Reifel et al., "Telematics: The Game Changer—Reinventing Auto Insurance", A.T. Kearney (2010).

Roberts, "What is Telematics Insurance?", MoneySupermarket (Jun. 20, 2012).

Ryan, Can having safety features reduce your insurance premiums? (Dec. 15, 2010).

Search Report in EP Application No. 13167206.5 dated Aug. 13, 2013, 6 pages.

Sharma, Driving the future: the legal implications of autonomous vehicles conference recap, downloaded from the Internet at: <http://law.scu.edu/hightech/autonomousvehicleconfrecap2012> (2012).

Stavens, Learning to Drive: Perception for Autonomous Cars, Stanford University, 104 pages (May 2011).

Stienstra, Autonomous Vehicles & the Insurance Industry, 2013 CAS Annual Meeting Minneapolis, MN (2013).

U.S. Appl. No. 14/215,789, filed Mar. 17, 2014, Baker et al., "Split Sensing Method".

U.S. Appl. No. 14/339,652, filed Jul. 24, 2014, Freeck et al., "System and Methods for Monitoring a Vehicle Operator and Monitoring an Operating Environment Within the Vehicle".

U.S. Appl. No. 14/511,712, filed Oct. 10, 2014, Fields et al., "Real-Time Driver Observation and Scoring for Driver's Education".

U.S. Appl. No. 14/511,750, filed Oct. 10, 2014, Fields et al., Real-Time Driver Observation and Scoring for Driver's Education.

U.S. Appl. No. 14/528,424, filed Oct. 30, 2014, Christensen et al., "Systems and Methods for Processing Trip-Based Insurance Policies".

U.S. Appl. No. 14/528,642, filed Oct. 30, 2014, Christensen et al., "Systems and Methods for Managing Units Associated with Time-Based Insurance Policies".

U.S. Appl. No. 14/713,184, filed May 15, 2015, Konrardy et al., "Autonomous Vehicle Insurance Pricing".

U.S. Appl. No. 14/713,188, filed May 15, 2015, Konrardy et al., "Autonomous Feature Use Monitoring and Insurance Pricing".

U.S. Appl. No. 14/713,194, filed May 15, 2015, Konrardy et al., "Autonomous Communication Feature Use and Insurance Pricing".

(56) References Cited

OTHER PUBLICATIONS

U.S. Appl. No. 14/713,201, filed May 15, 2015, Konrardy et al., "Autonomous Vehicle Insurance Pricing and Offering Based Upon Accident Risk Factors".
U.S. Appl. No. 14/713,206, filed May 15, 2015, Konrardy et al., "Determining Autonomous Vehicle Technology Performance for Insurance Pricing and Offering".
U.S. Appl. No. 14/713,214, filed May 15, 2015, Konrardy et al., "Accident Risk Model Determination Using Autonomous Vehicle Operating Data".
U.S. Appl. No. 14/713,217, filed May 15, 2015, Konrardy et al., "Autonomous Vehicle Operation Feature Usage Recommendations".
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,226, filed May 15, 2015, Konrardy et al., "Accident Response Using Autonomous Vehicle Monitoring".
U.S. Appl. No. 14/713,230, filed May 15, 2015, Konrardy et al., "Accident Fault Determination for Autonomous Vehicles".
U.S. Appl. No. 14/713,237, filed May 15, 2015, Konrardy et al., "Autonomous Vehicle Technology Effectiveness Determination for Insurance Pricing".
U.S. Appl. No. 14/713,240, filed May 15, 2015, Konrardy et al., "Fault Determination with Autonomous Feature Use Monitoring".
U.S. Appl. No. 14/713,244, filed May 15, 2015, Konrardy et al., "Autonomous Vehicle Operation Feature Evaulation".
U.S. Appl. No. 14/713,249, filed May 15, 2015, Konrardy et al., "Autonomous Vehicle Operation Feature Monitoring and Evaluation of Effectiveness".
U.S. Appl. No. 14/713,254, filed May 15, 2015, Konrardy et al., "Accident Fault Determination for Autonomous Vehicles".
U.S. Appl. No. 14/713,261, filed May 15, 2015, Konrardy et al., "Accident Fault Determination for Autonomous Vehicles".
U.S. Appl. No. 14/713,266, filed May 15, 2015, Konrardy et al., "Autonomous Vehicle Operation Feature Monitoring and Evaluation of Effectiveness".
U.S. Appl. No. 14/713,271, filed May 15, 2015, Konrardy et al. "Fully Autonomous Vehicle Insurance Pricing".
U.S. Appl. No. 14/729,290, filed Jun. 3, 2015, Fields et al., "Advanced Vehicle Operator Intelligence System".
U.S. Appl. No. 14/857,242, filed Sep. 17, 2015, Fields et al., "Advanced Vehicle Operator Intelligence System".
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, filed Nov. 6, 2015, Fields et al., "Autonomous Vehicle Operating Style and Mode Monitoring".
U.S. Appl. No. 14/934,345, filed Nov. 6, 2015, Fields et al., "Autonomous Vehicle Feature Recommendations".
U.S. Appl. No. 14/934,347, filed Nov. 6, 2015, Fields et al., "Autonomous Vehicle Software Version Assessment".
U.S. Appl. No. 14/934,352, filed Nov. 6, 2015, Fields et al., "Autonomous Vehicle Automatic Parking".
U.S. Appl. No. 14/934,355, filed Nov. 6, 2015, Fields et al., "Autonomous Vehicle Insurance Based Upon Usage".
U.S. Appl. No. 14/934,357, filed Nov. 6, 2015, Fields et al., "Autonomous Vehicle Salvage and Repair".
U.S. Appl. No. 14/934,361, filed Nov. 6, 2015, Fields et al., "Autonomous Vehicle Infrastructure Communication Device".
U.S. Appl. No. 14/934,371, filed Nov. 6, 2015, Fields et al., "Autonomous Vehicle Accident and Emergency Response".
U.S. Appl. No. 14/934,381, filed Nov. 6, 2015, Fields et al., "Personal Insurance Policies".
U.S. Appl. No. 14/934,385, filed Nov. 6, 2015, Fields et al., "Autonomous Vehicle Operating Status Assessment".
U.S. Appl. No. 14/934,388, filed Nov. 6, 2015, Fields et al., "Autonomous Vehicle Control Assessment and Selection".
U.S. Appl. No. 14/934,393, filed Nov. 6, 2015, Fields et al., "Autonomous Vehicle Control Assessment and Selection".
U.S. Appl. No. 14/934,400, filed Nov. 6, 2015, Fields et al., "Autonomous Vehicle Control Assessment and Selection".
U.S. Appl. No. 14/934,405, filed Nov. 6, 2015, Fields et al., "Autonomous Vehicle Automatic Parking".
U.S. Appl. No. 14/951,774, filed Nov. 25, 2015, Konrardy et al., "Fully Autonomous Vehicle Insurance Pricing".
U.S. Appl. No. 14/951,798, filed Nov. 25, 2015, Konrardy et al., "Accident Fault Determination for Autonomous Vehicles".
U.S. Appl. No. 14/951,803, filed Nov. 25, 2015, Konrardy et al., "Accident Fault Determination for Autonomous Vehicles".
U.S. Appl. No. 14/978,266, filed Dec. 22, 2015, Konrardy et al., "Autonomous Feature Use Monitoring and Telematics".
U.S. Appl. No. 15/241,769, filed Aug. 19, 2016, Fields et al., "Vehiclular Traffic Alerts for Avoidance of Abnormal Traffic Conditions".
U.S. Appl. No. 15/241,812, filed Aug. 19, 2016, Fields et al., "Using Personal Telematics Data for Rental or Insurance Discounts".
U.S. Appl. No. 15/241,817, filed Aug. 19, 2016, Fields et al., "Vehicular Accident Risk Monitoring and Assessment".
U.S. Appl. No. 15/241,826, filed Aug. 19, 2016, Fields et al., "Shared Vehicle Usage, Monitoring and Feedback".
U.S. Appl. No. 15/241,832, filed Aug. 19, 2016, Fields et al., "Vehicular Driver Evaluation".
U.S. Appl. No. 15/241,842, filed Aug. 19, 2016, Fields et al., "Vehicular Driver Warnings".
U.S. Appl. No. 15/241,849, filed Aug. 19, 2016, Fields et al., "Vehicular Warnings Based Upon Pedestrian or Cyclist Presence".
U.S. Appl. No. 15/241,859, filed Aug. 19, 2016, Fields et al., "Determination of Drvier or Vehicle Discounts and Risk Profiles Based Upon Vehicular Travel Environment".
U.S. Appl. No. 15/241,916, filed Aug. 19, 2016, Fields et al., "Determination and Reconstruction of Vehicular Cause and Collision".
U.S. Appl. No. 15/241,922, filed Aug. 19, 2016, Fields et al., "Electric Vehicle Battery Conservation".
U.S. Appl. No. 15/241,932, filed Aug. 19, 2016, Fields et al., "Vehiclular Driver Profiles and Discounts".
U.S. Appl. No. 15/409,092, filed Jan. 18, 2017, Konrardy et al., "Autonomous Vehicle Action Communications".
U.S. Appl. No. 15/409,099, filed Jan. 18, 2017, Konrardy et al., "Autonomous Vehicle Path Coordination".
U.S. Appl. No. 15/409,107, filed Jan. 18, 2017, Konrardy et al. "Autonomous Vehicle Signal Control".
U.S. Appl. No. 15/409,136, filed Jan. 18, 2017, Konrardy et al., "Method and System for Enhancing the Functionality of a Vehicle".
U.S. Appl. No. 15/409,143, filed Jan. 18, 2017, Konrardy et al. "Autonomous Operation Suitability Assessment and Mapping".
U.S. Appl. No. 15/409,146, filed Jan. 18, 2017, Konrardy et al., "Autonomous Vehicle Routing".
U.S. Appl. No. 15/409,148, filed Jan. 18, 2017, Konrardy et al., "System and Method for Autonomous Vehicle Sharing Using Facial Recognition".
U.S. Appl. No. 15/409,149, filed Jan. 18, 2017, Konrardy et al., "Autonomous Vehicle Routing During Emergencies".
U.S. Appl. No. 15/409,159, filed Jan. 18, 2017, Konrardy et al. "Autonomous Vehicle Trip Routing".
U.S. Appl. No. 15/409,163, filed Jan. 18, 2017, Konrardy et al. "Autonomous Vehicle Parking".
U.S. Appl. No. 15/409,167, filed Jan. 18, 2017, Konrardy et al. "Autonomous Vehicle Retrieval".
U.S. Appl. No. 15/409,180, filed Jan. 18, 2017, Konrardy et al., "Method and System for Repairing a Malfunctioning Autonomous Vehicle".
U.S. Appl. No. 15/409,198, filed Jan. 18, 2017, Konrardy et al., "System and Method for Autonomous Vehicle Ride Sharing Using Facial Recognition".
U.S. Appl. No. 15/409,213, filed Jan. 18, 2017, Konrardy et al., "Coordinated Autonomous Vehicle Automatic Area Scanning".

(56) References Cited

OTHER PUBLICATIONS

U.S. Appl. No. 15/409,215, filed Jan. 18, 2017, Konrardy et al., "Autonomous Vehicle Sensor Malfunction Detection".
U.S. Appl. No. 15/409,220, filed Jan. 18, 2017, Konrardy et al., "Autonomous Electric Vehicle Charging".
U.S. Appl. No. 15/409,228, filed Jan. 18, 2017, Konrardy et al., "Operator-Specific Configuration of Autonomous Vehicle Operation".
U.S. Appl. No. 15/409,236, filed Jan. 18, 2017, Konrardy et al., "Autonomous Vehicle Operation Adjustment Based Upon Route".
U.S. Appl. No. 15/409,239, filed Jan. 18, 2017, Konrardy et al., "Autonomous Vehicle Component Maintenance and Repair".
U.S. Appl. No. 15/409,243, filed Jan. 18, 2017, Konrardy et al., "Anomalous Condition Detection and Response for Autonomous Vehicles".
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/410,192, filed Jan. 19, 2017, Konrardy et al. "Autonomous Vehicle Operation Feature Monitoring and Evaluation of Effectiveness".
U.S. Appl. No. 15/413,796, filed Jan. 24, 2017, Konrardy et al., "Autonomous Vehicle Refueling".
U.S. Appl. No. 15/421,508, filed Feb. 1, 2017, Konrardy et al., "Autonomous Vehicle Operation Feature Monitoring and Evaluation of Effectiveness".
U.S. Appl. No. 15/421,521, filed Feb. 1, 2017, Konrardy et al., "Autonomous Vehicle Operation Feature Monitoring and Evaluation of Effectiveness".
U.S. Appl. No. 15/472,813, filed Mar. 29, 2017, Konrardy et al., "Accident Response Using Autonomous Vehicle Monitoring".
U.S. Appl. No. 15/491,487, filed Apr. 19, 2017, Konrardy et al., "Autonomous Vehicle Insurance Pricing and Offering Based Upon Accident Risk Factors".
Wiesenthal et al., "The Influence of Music on Driver Stress," Journal of Applied Social Psychology 30(8):1709-19 (2000).
Wiesenthal, David L., Dwight A. Hennessy, and Brad Totten, "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
Zhou et al., A Simulation Model to Evaluate and Verify Functions of Autonomous Vehicle Based on Simulink, Tongji University, 12 pages (2009).
U.S. Appl. No. 15/409,305, filed Jan. 18, 2017, Konrardy et al., "Component Malfunction Impact Assessment".

\* cited by examiner

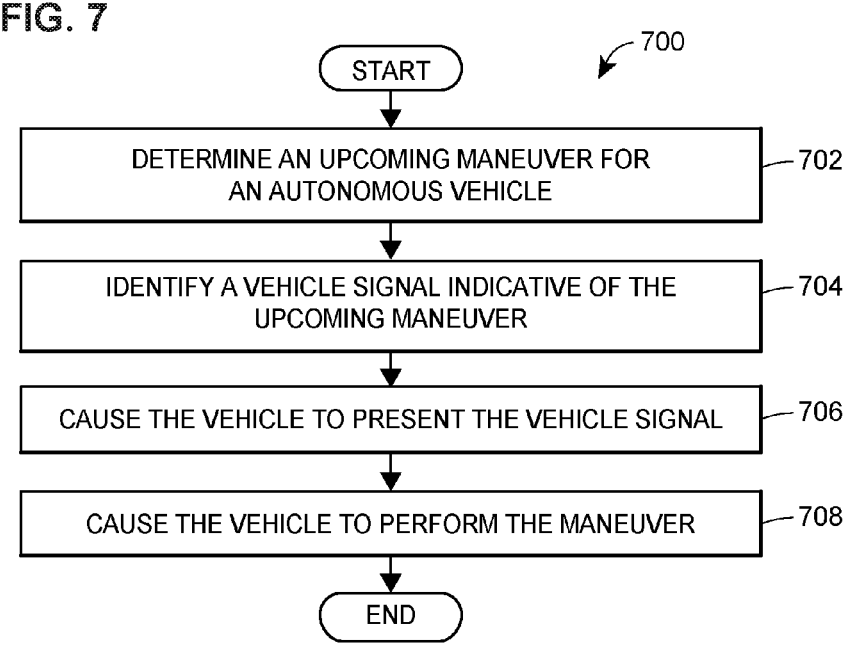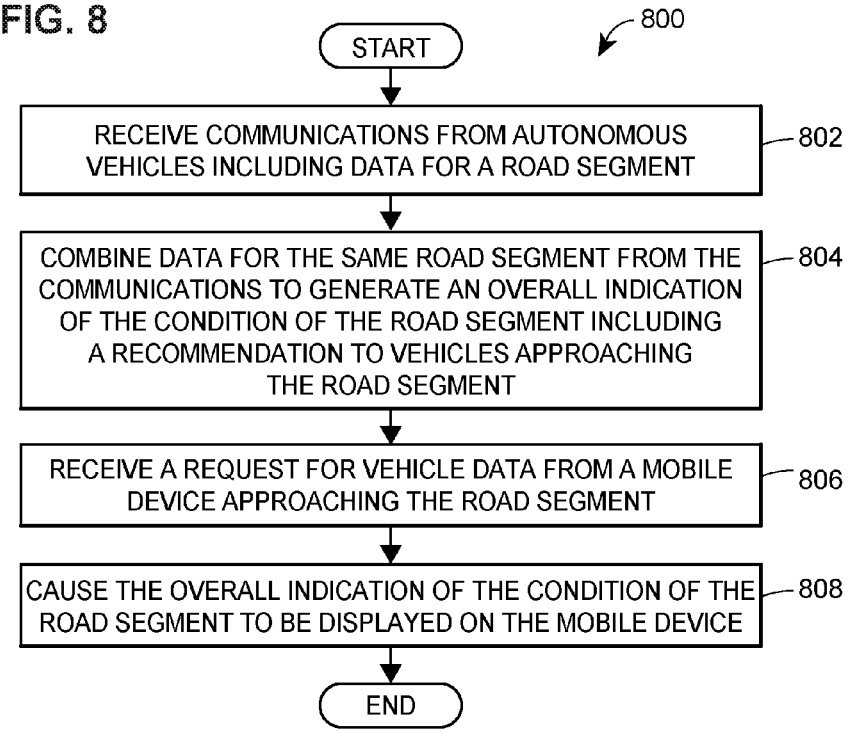

AUTONOMOUS VEHICLE APPLICATION

CROSS-REFERENCE TO RELATED APPLICATIONS

This application claims priority to and the benefit of the filing date of the following applications: (1) provisional U.S. Patent Application No. 62/286,017 entitled "Autonomous Vehicle Routing, Maintenance, & Fault Determination," filed on Jan. 22, 2016; (2) provisional U.S. Patent Application No. 62/287,659 entitled "Autonomous Vehicle Technology," filed on Jan. 27, 2016; (3) provisional U.S. Patent Application No. 62/302,990 entitled "Autonomous Vehicle Routing," filed on Mar. 3, 2016; (4) provisional U.S. Patent Application No. 62/303,500 entitled "Autonomous Vehicle Routing," filed on Mar. 4, 2016; (5) provisional U.S. Patent Application No. 62/312,109 entitled "Autonomous Vehicle Routing," filed on Mar. 23, 2016; (6) provisional U.S. Patent Application No. 62/349,884 entitled "Autonomous Vehicle Component and System Assessment," filed on Jun. 14, 2016; (7) provisional U.S. Patent Application No. 62/351,559 entitled "Autonomous Vehicle Component and System Assessment," filed on Jun. 17, 2016; (8) provisional U.S. Patent Application No. 62/373,084 entitled "Autonomous Vehicle Communications," filed on Aug. 10, 2016; (9) provisional U.S. Patent Application No. 62/376,044 entitled "Autonomous Operation Expansion through Caravans," filed on Aug. 17, 2016; (10) provisional U.S. Patent Application No. 62/380,686 entitled "Autonomous Operation Expansion through Caravans," filed on Aug. 29, 2016; (11) provisional U.S. Patent Application No. 62/381,848 entitled "System and Method for Autonomous Vehicle Sharing Using Facial Recognition," filed on Aug. 31, 2016; (12) provisional U.S. Patent Application No. 62/406,595 entitled "Autonomous Vehicle Action Communications," filed on Oct. 11, 2016; (13) provisional U.S. Patent Application No. 62/406,600 entitled "Autonomous Vehicle Path Coordination," filed on Oct. 11, 2016; (14) provisional U.S. Patent Application No. 62/406,605 entitled "Autonomous Vehicle Signal Control," filed on Oct. 11, 2016; (15) provisional U.S. Patent Application No. 62/406,611 entitled "Autonomous Vehicle Application," filed on Oct. 11, 2016; (16) provisional U.S. Patent Application No. 62/415,668 entitled "Method and System for Enhancing the Functionality of a Vehicle," filed on Nov. 1, 2016; (17) provisional U.S. Patent Application No. 62/415,672 entitled "Method and System for Repairing a Malfunctioning Autonomous Vehicle," filed on Nov. 1, 2016; (18) provisional U.S. Patent Application No. 62/415,673 entitled "System and Method for Autonomous Vehicle Sharing Using Facial Recognition," filed on Nov. 1, 2016; (19) provisional U.S. Patent Application No. 62/415,678 entitled "System and Method for Autonomous Vehicle Ride Sharing Using Facial Recognition," filed on Nov. 1, 2016; (20) provisional U.S. Patent Application No. 62/418,988 entitled "Virtual Testing of Autonomous Vehicle Control System," filed on Nov. 8, 2016; (21) provisional U.S. Patent Application No. 62/418,999 entitled "Detecting and Responding to Autonomous Vehicle Collisions," filed on Nov. 8, 2016; (22) provisional U.S. Patent Application No. 62/419,002 entitled "Automatic Repair on Autonomous Vehicles," filed on Nov. 8, 2016; (23) provisional U.S. Patent Application No. 62/419,009 entitled "Autonomous Vehicle Component Malfunction Impact Assessment," filed on Nov. 8, 2016; (24) provisional U.S. Patent Application No. 62/419,017 entitled "Autonomous Vehicle Sensor Malfunction Detection," filed on Nov. 8, 2016; (25) provisional U.S. Patent Application No. 62/419,023 entitled "Autonomous Vehicle Damage and Salvage Assessment," filed on Nov. 8, 2016; (26) provisional U.S. Patent Application No. 62/424,078 entitled "Systems and Methods for Sensor Monitoring," filed Nov. 18, 2016; (27) provisional U.S. Patent Application No. 62/424,093 entitled "Autonomous Vehicle Sensor Malfunction Detection," filed on Nov. 18, 2016; (28) provisional U.S. Patent Application No. 62/428,843 entitled "Autonomous Vehicle Control," filed on Dec. 1, 2016; (29) provisional U.S. Patent Application No. 62/430,215 entitled Autonomous Vehicle Environment and Component Monitoring," filed on Dec. 5, 2016; (30) provisional U.S. Patent Application No. 62/434,355 entitled "Virtual Testing of Autonomous Environment Control System," filed Dec. 14, 2016; (31) provisional U.S. Patent Application No. 62/434,359 entitled "Detecting and Responding to Autonomous Environment Incidents," filed Dec. 14, 2016; (32) provisional U.S. Patent Application No. 62/434,361 entitled "Component Damage and Salvage Assessment," filed Dec. 14, 2016; (33) provisional U.S. Patent Application No. 62/434,365 entitled "Sensor Malfunction Detection," filed Dec. 14, 2016; (34) provisional U.S. Patent Application No. 62/434,368 entitled "Component Malfunction Impact Assessment," filed Dec. 14, 2016; and (35) provisional U.S. Patent Application No. 62/434,370 entitled "Automatic Repair of Autonomous Components," filed Dec. 14, 2016. The entire contents of each of the preceding applications are hereby expressly incorporated herein by reference.

Additionally, the present application is related to the following co-pending U.S. patent applications: (1) U.S. patent application Ser. No. 15/409,143 entitled "Autonomous Operation Suitability Assessment and Mapping," filed Jan. 18, 2017; (2) U.S. patent application Ser. No. 15/409,146 Entitled "Autonomous Vehicle Routing," Filed Jan. 18, 2017; (3) U.S. patent application Ser. No. 15/409,149 entitled "Autonomous Vehicle Routing During Emergencies," filed Jan. 18, 2017; (4) U.S. patent application Ser. No. 15/409,159 entitled "Autonomous Vehicle Trip Routing," filed Jan. 18, 2017; (5) U.S. patent application Ser. No. 15/409,163 entitled "Autonomous Vehicle Parking," filed Jan. 18, 2017; (6) U.S. patent application Ser. No. 15/409,167 entitled "Autonomous Vehicle Retrieval," filed Jan. 18, 2017; (7) U.S. patent application Ser. No. 15/409,092 entitled "Autonomous Vehicle Action Communications," filed Jan. 18, 2017; (8) U.S. patent application Ser. No. 15/409,099 entitled "Autonomous Vehicle Path Coordination," filed Jan. 18, 2017; (9) U.S. patent application Ser. No. 15/409,107 entitled "Autonomous Vehicle Signal Control," filed Jan. 18, 2017; (10) U.S. (10) U.S. patent application Ser. No. 15/409,136 entitled "Method and System for Enhancing the Functionality of a Vehicle," filed Jan. 18, 2017; (11) U.S. patent application Ser. No. 15/409,180 entitled "Method and System for Repairing a Malfunctioning Autonomous Vehicle," filed Jan. 18, 2017; (12) U.S. patent application Ser. No. 15/409,148 entitled "System and Method for Autonomous Vehicle Sharing Using Facial Recognition," filed Jan. 18, 2017; (13) U.S. patent application Ser. No. 15/409,198 entitled "System and Method for Autonomous Vehicle Ride Sharing Using Facial Recognition," filed Jan. 18, 2017; (14) U.S. patent application Ser. No. 15/409,215 entitled "Autonomous Vehicle Sensor Malfunction Detection," filed Jan. 18, 2017; (15) U.S. patent application Ser. No. 15/409,248 entitled "Sensor Malfunction Detection," filed Jan. 18, 2017; (16) U.S. patent application Ser. No. 15/409,271 entitled "Autonomous Vehicle Component Malfunction Impact Assessment," filed Jan. 18, 2017; (17) U.S. patent application Ser. No. 15/409,305 entitled "Component Malfunction Impact Assessment," filed Jan. 18, 2017; (18) U.S. patent application Ser. No. 15/409,318 entitled "Automatic Repair of Autonomous Vehicles," filed Jan. 18, 2017; (19) U.S. patent application Ser. No. 15/409,336 entitled "Automatic Repair of Autonomous Components," filed Jan. 18, 2017; (20) U.S. patent application Ser. No. 15/409,340 entitled "Autonomous Vehicle Damage and Salvage Assessment," filed Jan. 18, 2017; (21) U.S. patent application Ser. No. 15/409,349 entitled "Component Damage and Salvage Assessment," filed Jan. 18, 2017; (22) U.S. patent application Ser. No. 15/409,359 entitled "Detecting and Responding to Autonomous Vehicle Collisions," filed Jan. 18, 2017; (23) U.S. patent application Ser. No. 15/409,371 entitled "Detecting and Responding to Autonomous Environment Incidents," filed Jan. 18, 2017; (24) U.S. patent application Ser. No. 15/409,445 entitled "Virtual Testing of Autonomous Vehicle Control System," filed Jan. 18, 2017; (25) U.S. patent application Ser. No. 15/409,473 entitled "Virtual Testing of Autonomous Environment Control System," filed Jan. 18, 2017; (26) U.S. patent application Ser. No. 15/409,220 entitled "Autonomous Electric Vehicle Charging," filed Jan. 18, 2017; (27) U.S. patent application Ser. No. 15/409,213 entitled "Coordinated Autonomous Vehicle Automatic Area Scanning," filed Jan. 18, 2017; (28) U.S. patent application Ser. No. 15/409,228 entitled "Operator-Specific Configuration of Autonomous Vehicle Operation," filed Jan. 18, 2017; (29) U.S. patent application Ser. No. 15/409,236 entitled "Autonomous Vehicle Operation Adjustment Based Upon Route," filed Jan. 18, 2017; (30) U.S. patent application Ser. No. 15/409,239 entitled "Autonomous Vehicle Component Maintenance and Repair," filed Jan. 18, 2017; and (31) U.S. patent application Ser. No. 15/409,243 entitled "Anomalous Condition Detection and Response for Autonomous Vehicles," filed Jan. 18, 2017.

FIELD

The present disclosure generally relates to systems and methods for communicating between autonomous or semi-autonomous vehicles for signaling, collision avoidance, path coordination, or other autonomous control.

BACKGROUND

Vehicles are typically operated by a human vehicle operator who controls both steering and motive controls. Operator error, inattention, inexperience, misuse, or distraction leads to many vehicle collisions each year, resulting in injury and damage. Autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, thus requiring different means of control than traditional vehicles. Such vehicles also may include a plurality of advanced sensors, capable of providing significantly more data (both in type and quantity) than is available even from GPS navigation assistance systems installed in traditional vehicles.

Ensuring safe operation of such autonomous or semi-autonomous vehicles is of the utmost importance because the automated systems of these vehicles may not function properly in all environments. Although autonomous operation may be safer than manual operation under ordinary driving conditions, unusual or irregular environmental conditions may significantly impair the functioning of the autonomous operation features controlling the autonomous vehicle. Under some conditions, autonomous operation may become impractical or excessively dangerous. As an example, fog or heavy rain may greatly reduce the ability of autonomous operation features to safely control the vehicle. Additionally, damage or other impairment of sensors or other components of autonomous systems may significantly increase the risks associated with autonomous operation. Such conditions may change frequently, thereby changing the safety of autonomous vehicle operation.

BRIEF SUMMARY

The present embodiments may be related to autonomous or semi-autonomous vehicle operation, including driverless operation of fully autonomous vehicles. The embodiments described herein relate particularly to various aspects of communication between autonomous operation features, components, and software. An autonomous or semi-autonomous vehicle may communicate with other vehicles within a predetermined communication range to alert the other vehicles of maneuvers which the autonomous vehicle will make (e.g., turns, lane changes, etc.) or to coordinate actions between several vehicles (e.g., coordinating paths based upon when each vehicle will exit a highway). Additionally, some aspects relate to communications which alert other vehicles of road segment conditions as the other vehicles approach the road segment, such as traffic, accidents, potholes, ice patches, construction, etc. Specific systems and methods are summarized below. The methods and systems summarized below may include additional, less, or alternate actions, including those discussed elsewhere herein.

In one aspect, a computer-implemented method for presenting vehicle data for a road segment based upon data collected from one or more vehicles each having one or more autonomous operation features may be provided. The method may include receiving one or more communications from one or more vehicles each having one or more autonomous operation features, wherein each of the one or more communications include data corresponding to a same road segment on which the one or more vehicles travelled, and wherein the data includes an indication of a location within the road segment and an indication of a condition of the road segment at the location; combining the data for the same road segment from the one or more communications to generate an overall indication of the condition of the road segment, wherein the overall indication includes a recommendation to vehicles approaching the road segment; receiving a request to display vehicle data from a mobile device within a vehicle approaching the road segment; and/or causing the overall indication for the road segment to be displayed on a user interface of the mobile device.

The overall indication of the condition of the road segment may include a recommendation to change vehicle operation from a manual mode to an autonomous mode and/or in response to receiving the recommendation the vehicle may switch to an autonomous mode or the overall indication of the condition of the road segment may include a recommendation to change vehicle operation from the autonomous mode to the manual mode and/or in response to receiving the recommendation the vehicle may switch to the manual mode. The recommendation may also include an action for the vehicle to perform based upon the overall indication of the condition of the road segment. In some embodiments, the one or more vehicles may obtain the data corresponding to the road segment from a smart infrastructure component.

An indication of the condition of the road segment at the location may include at least one of: (i) traffic at the location, (ii) a maneuver to be performed by the corresponding vehicle at the location, (iii) an amount of wear and tear on the road segment, (iv) whether the road segment is currently under construction, and/or (v) unexpected debris on the road segment. Traffic at the road segment may include: an indication of a vehicle collision on the road segment, an indication of construction occurring on the road segment, a number of vehicles on the road segment, and/or a number of vehicles planning to exit the road segment. Additionally, the amount of wear and tear on the road segment may include at least one of: a number of potholes on the road segment, one or more ice patches on the road segment, and/or one or more cracks in the road segment. Unexpected debris on the road segment may include at least one of: a fallen branch on the road segment, a flooded portion of the road segment, a rock on the road segment, fallen cargo on the road segment, a portion of a shredded tire on the road segment, or broken glass on the road segment.

In some embodiments, combining the data for the same road segment from the one or more communications to generate an overall indication of the condition of the road segment may include assigning a weight to the data from each communication based upon the time when the communication is sent, wherein data from communications sent more recently is weighted higher than data from communication sent earlier; and/or combining the weighted data for the same road segment to generate the overall indication of the road segment.

Systems or computer-readable media storing instructions for implementing all or part of the system described above may also be provided in some aspects. Systems for implementing such methods may include one or more of the following: a special-purpose assessment computing device, a mobile computing device, a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 7 illustrates a flow diagram of an exemplary signal control method for presenting a vehicle signal from an autonomous vehicle indicative of an upcoming maneuver; and FIG. 8 illustrates a flow diagram of an exemplary autonomous vehicle crowdsourcing method for presenting vehicle data regarding a road segment based upon data collected from several autonomous vehicles.

DETAILED DESCRIPTION

Figure 1A:
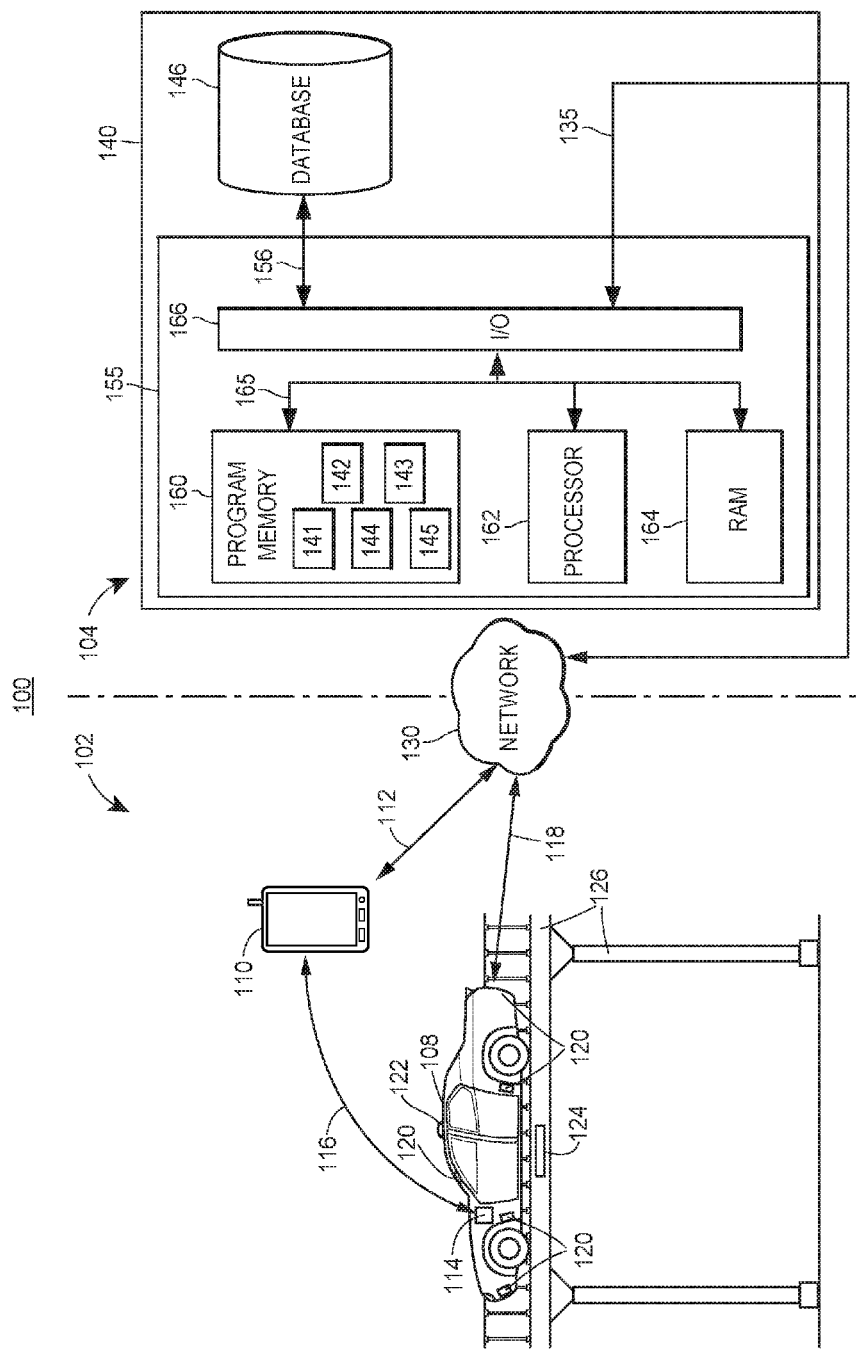
FIG. 1A illustrates a block diagram of an exemplary autonomous vehicle data system for autonomous vehicle operation, monitoring, communication, and related functions.

The systems and methods disclosed herein generally relate to various aspects of communication between autonomous operation features, components, and software. Responses to accidents, collisions, and other events causing malfunctions or damage are discussed below. Assessment of components and features may be performed as part of detecting malfunctions, determining repairs, determining component operating status, or generally evaluating effectiveness or reliability of components and features. To this end, the systems and methods may include collecting, communicating, evaluating, predicting, and/or utilizing data associated with autonomous or semi-autonomous operation features for controlling a vehicle. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous vehicles or features may be used to assess the autonomous features themselves while in operation or to provide pertinent information to non-autonomous vehicles through an electronic communication network. These and other advantages are further described below.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle. Alternatively, autonomous operation features may be incapable of some actions typically taken by human operators, particularly when the features or other components of the vehicle are damaged or inoperable. Moreover, combinations of autonomous operation features may further affect operating risks due to synergies or conflicts between features. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with vehicle operation with and without the autonomous operation features may be used to determine risk categories or premiums for a vehicle insurance policy covering a vehicle with autonomous operation features, as described elsewhere herein. Risk category or price may be determined based upon factors relating to the evaluated effectiveness of the autonomous vehicle features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Exemplary Autonomous Vehicle Operation System

FIG. 1A illustrates a block diagram of an exemplary autonomous vehicle data system 100 on which the exemplary methods described herein may be implemented. The high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 and/or personal electronic devices installed within the vehicle 108 that may communicate with the on-board computer 114. The front-end components 102 may further process the sensor data using the on-board computer 114 or a mobile device 110 (e.g., a smart phone, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, or combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more servers 140. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a real-time communication application 143 for communicating information regarding vehicle or environmental conditions between a plurality of vehicles, a navigation application 144 for assisting autonomous or semi-autonomous vehicle operation, and an accident detection application 145 for identifying accidents and providing assistance. The various software applications may be executed on the same computer processor or on different computer processors.

Figure 1B:
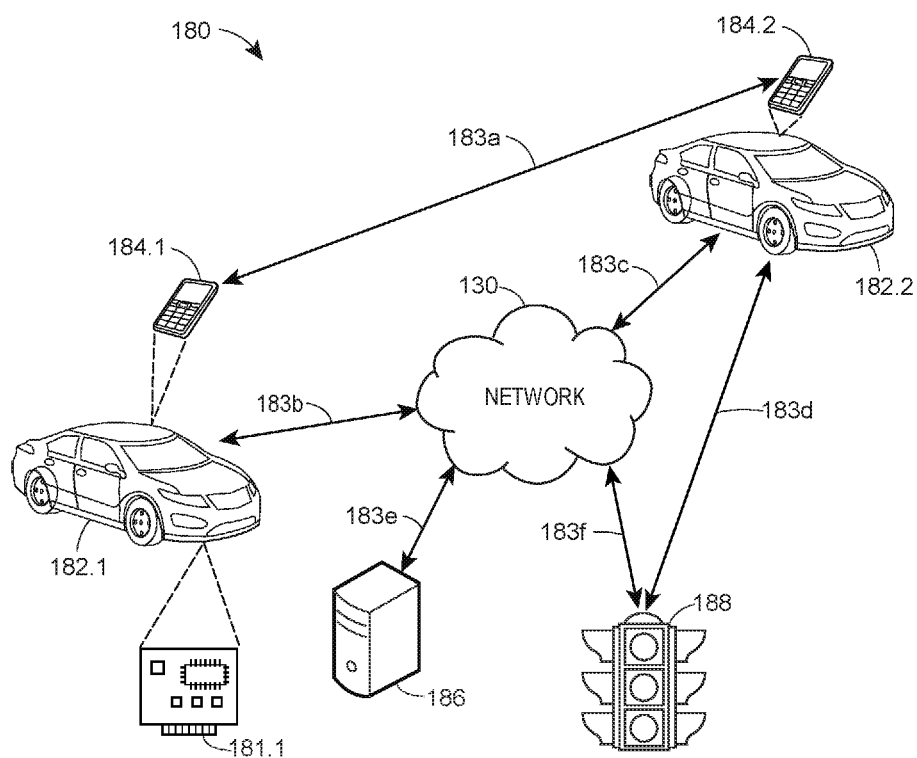
FIG. 1B illustrates a block diagram of an exemplary autonomous vehicle communication system, showing a plurality of vehicles and smart infrastructure components.

FIG. 1B illustrates a block diagram of an exemplary autonomous vehicle communication system 180 on which the exemplary methods described herein may be implemented. In one aspect, system 180 may include a network 130, N number of vehicles 182.1-182.N and respective mobile computing devices 184.1-184.N, one or several personal electronic devices (not shown), an external computing device 186, and/or a smart infrastructure component 188. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise. The personal electronic devices may include any type of electronic device that monitors conditions associated with an individual. For example, the personal electronic device may be a smart watch, a fitness tracker, a personal medical device (e.g., a pace maker, an insulin pump, etc.) and/or monitoring devices thereof, smart implants, and so on. The personal electronic device may monitor the conditions of the individual while the individual is present in one of the vehicles 182 and/or operating one of the vehicles 182 in a semi-autonomous mode.

Although system 180 is shown in FIG. 1B as including one network 130, two mobile computing devices 184.1 and 184.2, two vehicles 182.1 and 182.2, one external computing device 186, and one smart infrastructure component 188, various embodiments of system 180 may include any suitable number of networks 130, mobile computing devices 184, vehicles 182, external computing devices 186, and/or infrastructure components 188. The vehicles 182 included in such embodiments may include any number of vehicles 182.*i* having vehicle controllers 181.*i* (such as vehicle 182.1 with vehicle controller 181.1) and vehicles 182.*j* not having vehicle controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186 and/or smart infrastructure component 188, for example. In still other aspects, each of mobile computing devices 184.1 and 184.2 may be configured to communicate directly and/or indirectly with other suitable devices, which may include synchronous or asynchronous communication.

Each of mobile computing devices 184.1 and 184.2 and/or personal electronic devices may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 and/or personal electronic devices may also be configured to communicate with vehicles 182.1 and 182.2, respectively, utilizing a BLUETOOTH communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 and/or personal electronic devices may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Still further, one or more of mobile computing devices 184.1 and/or 184.2 and/or personal electronic devices may also be configured to communicate with one or more smart infrastructure components 188 directly (e.g., via radio link 183*d*) and/or indirectly (e.g., via radio links 183*c* and 183*f* via network 130) using any suitable communication protocols. Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*f* may represent wired links, wireless links, or any suitable combination thereof. For example, the links 183*e* and/or 183*f* may include wired links to the network 130, in addition to, or instead of, wireless radio connections.

In some embodiments, the external computing device 186 may mediate communication between the mobile computing devices 184.1 and 184.2 based upon location or other factors. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2. In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2 and/or personal electronic devices may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications. Such functionality may, in some embodiments be controlled in whole or part by a Data Application operating on the mobile computing devices 184, as discussed elsewhere herein. Such Data Application may communicate between the mobile computing devices 184 and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140 as discussed elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may facilitate the receipt of autonomous operation or other data from one or more mobile computing devices 184.1-184.N, which may each be running a Data Application to obtain such data from autonomous operation features or sensors 120 associated therewith.

In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc. In this way, data received from one or more mobile computing devices 184.1-184.N may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N.

In some aspects, external computing device 186 may facilitate indirect communications between one or more of mobile computing devices 184, vehicles 182, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a traffic light, a railroad crossing signal, a construction notification sign, a roadside display configured to display messages, a billboard display, a parking garage monitoring device, etc.

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183d and/or with mobile computing device 184.1 via links 183b and 183f utilizing network 130. As another example, smart infrastructure component 188 may communicate with external computing device 186 via links 183e and 183f utilizing network 130. To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Figure 2:
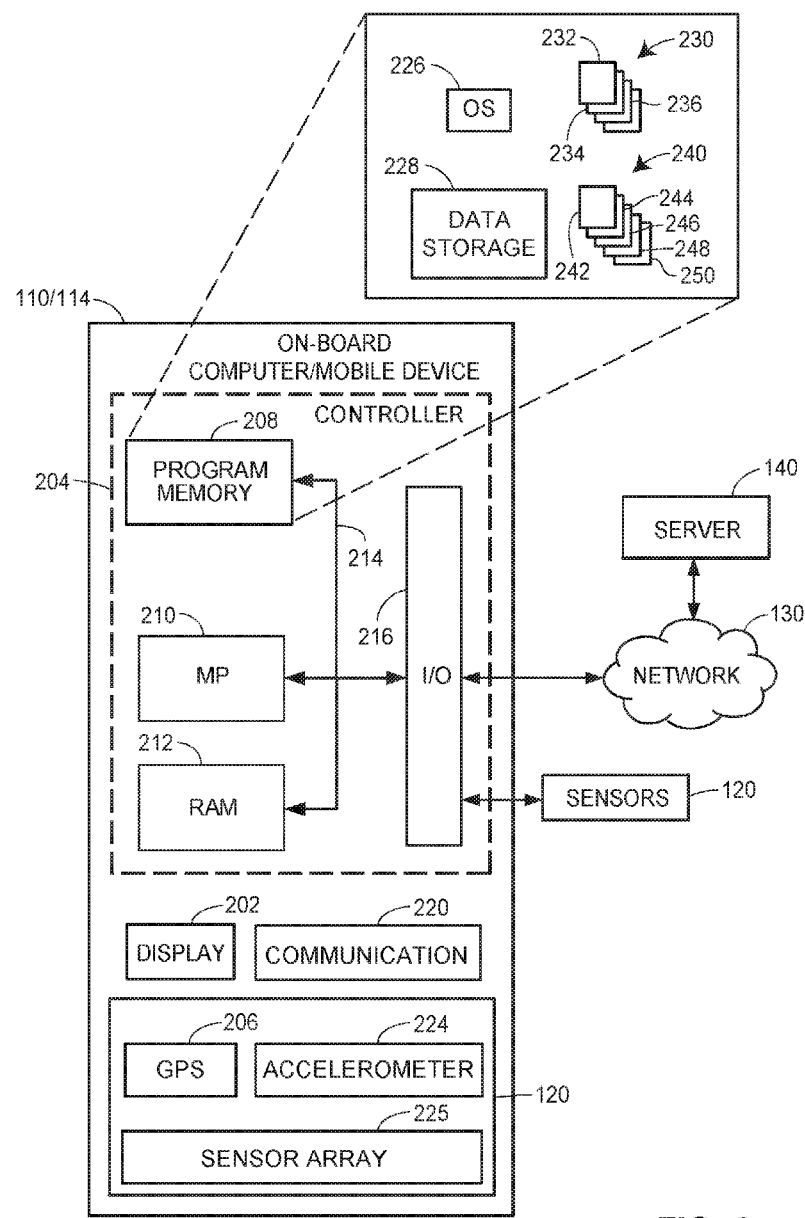
FIG. 2 illustrates a block diagram of an exemplary on-board computer or mobile device.

FIG. 2 illustrates a block diagram of an exemplary mobile device 110 or an exemplary on-board computer 114 consistent with the system 100 and the system 180. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 and/or personal electronic devices to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300, described further below. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110 or on-board computer 114, which may be executed by the one or more processors 210 thereof.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring method 400, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, and/or control commands sent from the on-board computer 114 to the control components (not shown) to operate the vehicle 108. In some embodiments, control commands generated by the on-board computer 114 but not implemented may also be recorded and/or transmitted for analysis of how the autonomous operation features would have responded to conditions if the features had been controlling the relevant aspect or aspects of vehicle operation. The information may be received and stored by the server 140 implementing the autonomous operation information monitoring application 141, and the server 140 may then determine the effectiveness of autonomous operation under various conditions by implementing the feature evaluation application 142, which may include an assessment of autonomous operation features compatibility. The effectiveness of autonomous operation features and the extent of their use may be further used to determine one or more risk levels associated with operation of the autonomous vehicle by the server 140.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Data Application

The mobile device 110 and/or on-board computer 114 may run a Data Application to collect, transmit, receive, and/or process autonomous operation feature data. Such autonomous operation feature data may include data directly generated by autonomous operation features, such as control commands used in operating the vehicle 108. Similarly, such autonomous operation feature data may include shadow control commands generated by the autonomous operation features but not actually used in operating the vehicle, such as may be generated when the autonomous operation features are disabled. The autonomous operation feature data may further include non-control data generated by the autonomous operation features, such as determinations regarding environmental conditions in the vehicle operating environment in which the vehicle 108 operates (e.g., traffic conditions, construction locations, pothole locations, worn lane markings, corners with obstructed views, etc.). The autonomous operation feature data may yet further include sensor data generated by (or derived from sensor data generated by) sensors 120 utilized by the autonomous operation features. For example, data from LIDAR and ultrasonic sensors may be used by vehicles for autonomous operation. Such data captures a much more detailed and complete representation of the conditions in which the vehicle 108 operates than traditional vehicle operation metrics (e.g., miles driven) or non-autonomous telematics data (e.g., acceleration, position, and time).

Autonomous operation feature data may be processed and used by the Data Application to determine information regarding the vehicle 108, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 to other vehicles (or to mobile devices 110). By communicating information associated with the autonomous operation feature data to other nearby vehicles, the other vehicles or their operators may make use of such data for routing, control, or other purposes. This may be particularly valuable in providing detailed information regarding a vehicle environment (e.g., traffic, accidents, flooding, ice, etc.) collected by a Data Application of an autonomous vehicle 108 to a driver of a non-autonomous vehicle via a Data Application of a mobile device 110 associated with the driver. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108, via the user's mobile device 110 and/or the vehicle's on-board computer 114. The user may interact with the Data Application to locate, retrieve, park, control, or monitor the vehicle 108. For example, the Data Application may be used to select a destination and route the vehicle 108 to the destination, which may include controlling the vehicle to travel to the destination in a fully autonomous mode. In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with vehicle operation based upon location, autonomous operation feature use (including settings), operating conditions, or other factors. Such risk assessment may be further used in recommending autonomous feature use levels, generating warnings to a vehicle operator, or adjusting an insurance policy associated with the vehicle 108.

Data Applications may be installed and running on a plurality of mobile devices 110 and/or on-board computers 114 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110 and/or on-board computer 114, which may cause the vehicle 108 to operate in accordance with the determined information (e.g., travel along a determined optimal route). Thus, the Data Application may facilitate data communication between the front-end components 102 and the back-end components 104, allowing more efficient processing and data storage.

Exemplary Autonomous Vehicle Operation Method

Figure 3:
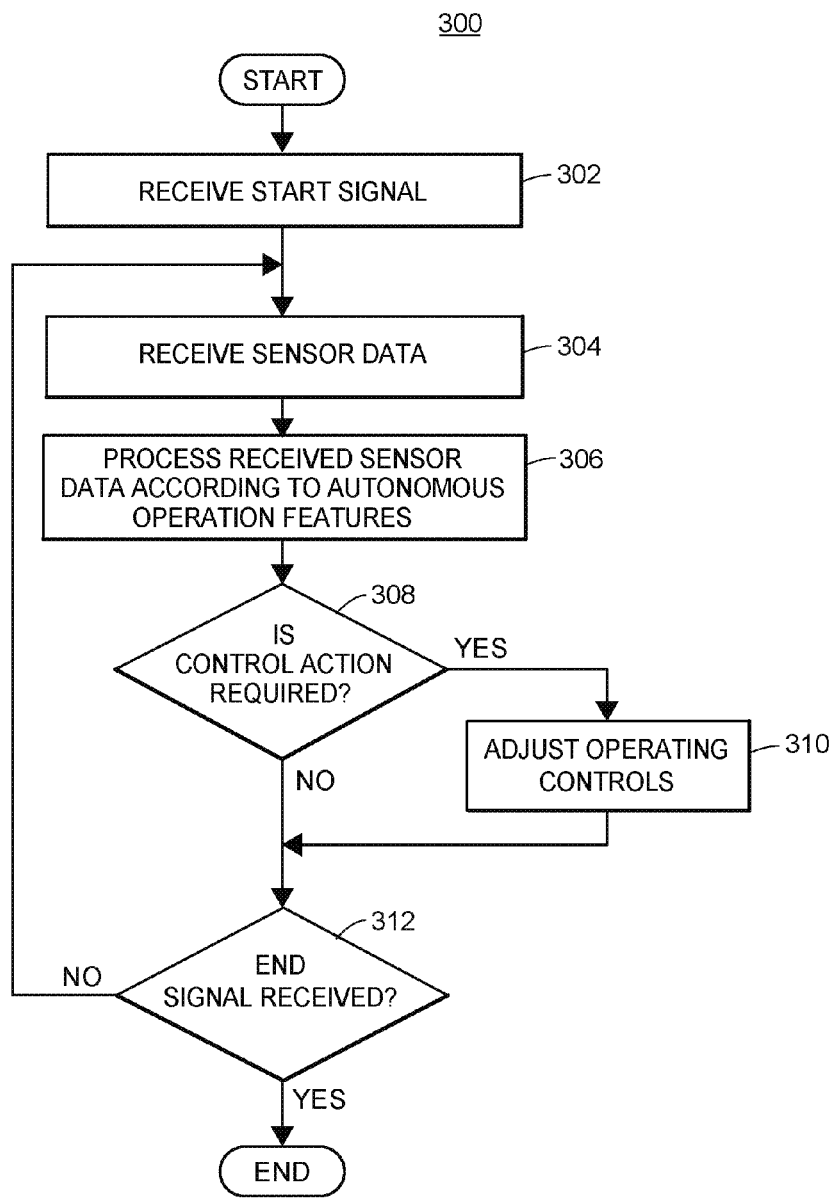
FIG. 3 illustrates a flow diagram of an exemplary autonomous vehicle operation method.

FIG. 3 illustrates a flow diagram of an exemplary autonomous vehicle operation method 300, which may be implemented by the autonomous vehicle data system 100. The method 300 may begin when the controller 204 receives a start signal (block 302). The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108. In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle). In some embodiments, the start signal may be generated by or received by the Data Application running on a mobile device 110 or on-board computer 114 within the vehicle 108. The Data Application may further set or record settings for one or more autonomous operation features of the vehicle 108.

After receiving the start signal at block 302, the controller 204 receives sensor data from the sensors 120 during vehicle operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The Data Application may receive the sensor data, or a portion thereof, and store or transmit the received sensor data. In some embodiments, the Data Application may process or determine summary information from the sensor data before storing or transmitting the summary information. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 (i.e., control commands). For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108.

When the controller 204 determines an autonomous control action is required (block 308), the controller 204 may cause the control components of the vehicle 108 to adjust the operating controls of the vehicle to achieve desired operation (block 310). For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles or infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

To control the vehicle 108, the autonomous operation features may generate and implement control decisions relating to the control of the motive, steering, and stopping components of the vehicle 108. The control decisions may include or be related to control commands issued by the autonomous operation features to control such control components of the vehicle 108 during operation. In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 even when the feature is disengaged (or engaged using other settings from those that would produce the shadow control decisions).

Data regarding the control decisions actually implemented and/or the shadow control decisions not implemented to control the vehicle 108 may be recorded for use in assessing autonomous operation feature effectiveness, accident reconstruction and fault determination, feature use or settings recommendations, risk determination and insurance policy adjustments, or other purposes as described elsewhere herein. For example, actual control decisions may be compared against control decisions that would have been made by other systems, software versions, or with additional sensor data or communication data.

As used herein, the terms "preferred" or "preferably made" control decisions mean control decisions that optimize some metric associated with risk under relevant conditions. Such metric may include, among other things, a statistical correlation with one or more risks (e.g., risks related to a vehicle collision) or an expected value associated with risks (e.g., a risk-weighted expected loss associated with potential vehicle accidents). The preferably made, or preferred or recommended, control decisions discussed herein may include control decisions or control decision outcomes that are less risky, have lower risk or the lowest risk of all the possible or potential control decisions given various operating conditions, and/or are otherwise ideal, recommended, or preferred based upon various operating conditions, including autonomous system or feature capability; current road, environmental or weather, traffic, or construction conditions through which the vehicle is traveling; and/or current versions of autonomous system software or components that the autonomous vehicle is equipped with and using.

The preferred or recommended control decisions may result in the lowest level of potential or actual risk of all the potential or possible control decisions given a set of various operating conditions and/or system features or capabilities. Alternatively, the preferred or recommended control decisions may result in a lower level of potential or actual risk (for a given set of operating conditions) to the autonomous vehicle and passengers, and other people or vehicles, than some of the other potential or possible control decisions that could have been made by the autonomous system or feature.

Exemplary Monitoring Method

Figure 4A:
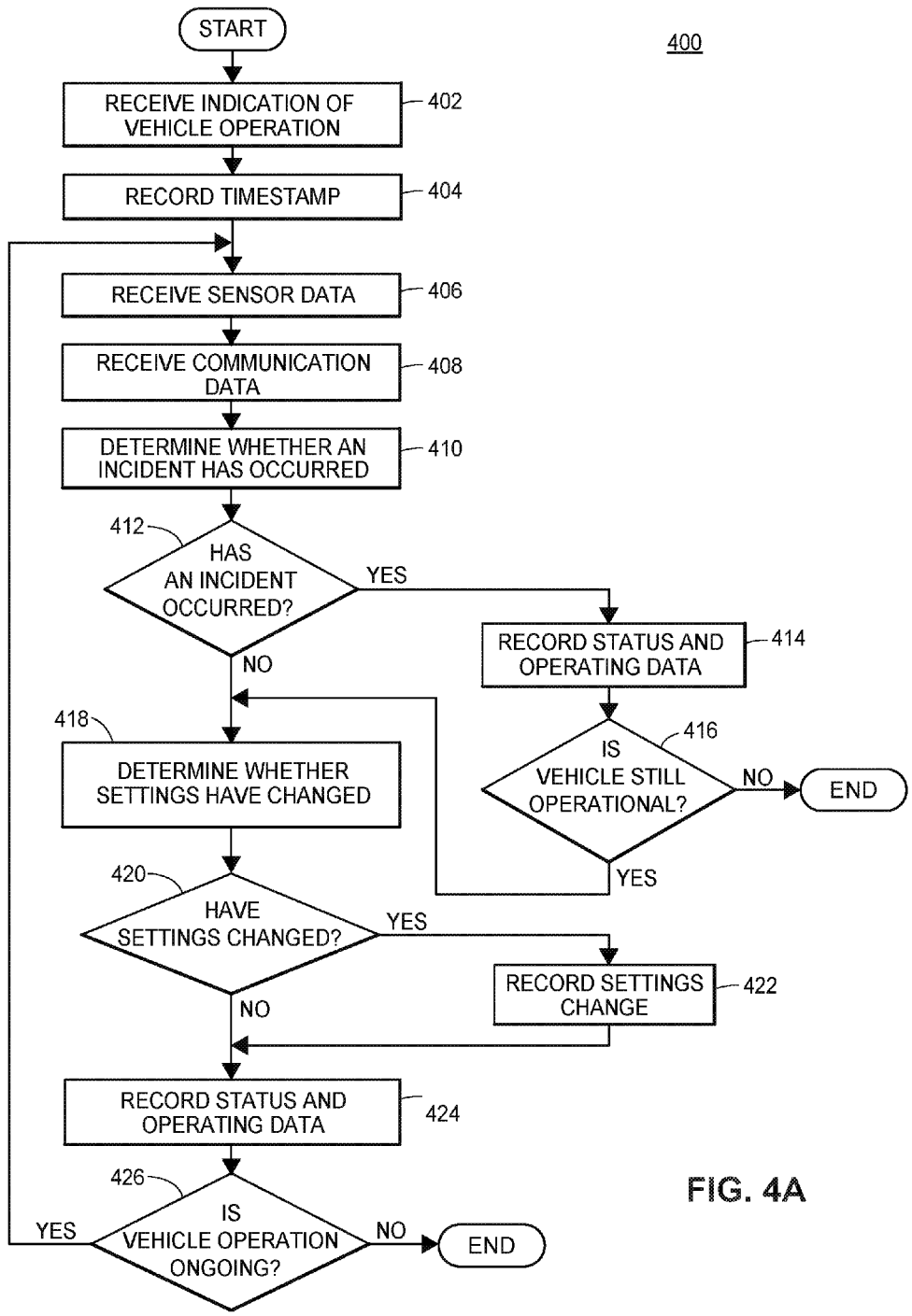
FIGS. 4A-B illustrate flow diagrams of exemplary autonomous vehicle operation monitoring methods for obtaining and recording information during vehicle operation.

FIG. 4A is a flow diagram depicting an exemplary autonomous vehicle operation monitoring method 400, which may be implemented by the autonomous vehicle data system 100. The method 400 monitors the operation of the vehicle 108 and transmits information regarding the vehicle 108 to the server 140, which information may then be used to determine autonomous operation feature usage or effectiveness. The method 400 may be used for monitoring the state of the vehicle 108, for providing data to other vehicles 182, for responding to emergencies or unusual situations during vehicle use, for testing autonomous operation features in a controlled environment, for determining actual feature use during vehicle operation outside a test environment, for assessment of feature operation, and/or for other purposes described herein. In alternative embodiments, the method 400 may be implemented whenever the vehicle 108 is in operation (manual or autonomous) or only when the autonomous operation features are enabled. The method 400 may likewise be implemented as either a real-time process, in which information regarding the vehicle 108 is communicated to the server 140 while monitoring is ongoing, or as a periodic process, in which the information is stored within the vehicle 108 and communicated to the server 140 at intervals (e.g., upon completion of a trip or when an incident occurs). In some embodiments, the method 400 may communicate with the server 140 in real-time when certain conditions exist (e.g., when a sufficient data connection through the network 130 exists or when no roaming charges would be incurred). In further embodiments, a Data Application executed by the mobile device 110 and/or on-board computer 114 may perform such monitoring, recording, and/or communication functions, including any of the functions described below with respect to blocks 402-434.

The method 400 may begin when the controller 204 receives an indication of vehicle operation (block 402). The indication may be generated when the vehicle 108 is started or when an autonomous operation feature is enabled by the controller 204 or by input from the vehicle operator, as discussed above. In response to receiving the indication, the controller 204 may create a timestamp (block 404). The timestamp may include information regarding the date, time, location, vehicle environment, vehicle condition, and autonomous operation feature settings or configuration information. The date and time may be used to identify one vehicle trip or one period of autonomous operation feature use, in addition to indicating risk levels due to traffic or other factors. The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.). Vehicle condition information may include information regarding the type, make, and model of the vehicle 108, the age or mileage of the vehicle 108, the status of vehicle equipment (e.g., tire pressure, non-functioning lights, fluid levels, etc.), or other information relating to the vehicle 108. In some embodiments, vehicle condition information may further include information regarding the sensors 120, such as type, configuration, or operational status (which may be determined, for example, from analysis of actual or test data from the sensors). In some embodiments, the timestamp may be recorded on the client device 114, the mobile device 110, or the server 140.

The autonomous operation feature settings may correspond to information regarding the autonomous operation features, such as those described above with reference to the autonomous vehicle operation method 300. The autonomous operation feature configuration information may correspond to information regarding the number and type of the sensors 120 (which may include indications of manufacturers and models of the sensors 120), the disposition of the sensors 120 within the vehicle 108 (which may include disposition of sensors 120 within one or more mobile devices 110), the one or more autonomous operation features (e.g., the autonomous vehicle operation application 232 or the software routines 240), autonomous operation feature control software, versions of the software applications 230 or routines 240 implementing the autonomous operation features, or other related information regarding the autonomous operation features.

For example, the configuration information may include the make and model of the vehicle 108 (indicating installed sensors 120 and the type of on-board computer 114), an indication of a malfunctioning or obscured sensor 120 in part of the vehicle 108, information regarding additional after-market sensors 120 installed within the vehicle 108, a software program type and version for a control program installed as an application 230 on the on-board computer 114, and software program types and versions for each of a plurality of autonomous operation features installed as applications 230 or routines 240 in the program memory 208 of the on-board computer 114.

During operation, the sensors 120 and/or personal electronic devices may generate sensor data regarding the vehicle 108 and its environment, which may include other vehicles 182 within the operating environment of the vehicle 108. In some embodiments, one or more of the sensors 120 and/or personal electronic devices may preprocess the measurements and communicate the resulting processed data to the on-board computer 114 and/or the mobile device 110. The controller 204 may receive sensor data from the sensors 120 and/or personal electronic devices (block 406). The sensor data may include information regarding the vehicle's position, speed, acceleration, direction, and responsiveness to controls. The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment. In some embodiments, sensors 120 may indicate the number of passengers within the vehicle 108, including an indication of whether the vehicle is entirely empty.

In addition to receiving sensor data from the sensors 120, in some embodiments the controller 204 may receive autonomous communication data from the communication component 122 or the communication module 220 (block 408). The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources (e.g., map databases, weather databases, or traffic and accident databases). In some embodiments, the communication data may include data from non-autonomous vehicles, which may include data regarding vehicle operation or anomalies within the operating environment determined by a Data Application operating on a mobile device 110 or on-board computer 114. The communication data may be combined with the received sensor data received to obtain a more robust understanding of the vehicle environment. For example, the server 140 or the controller 204 may combine sensor data indicating frequent changes in speed relative to tachometric data with map data relating to a road upon which the vehicle 108 is traveling to determine that the vehicle 108 is in an area of hilly terrain. As another example, weather data indicating recent snowfall in the vicinity of the vehicle 108 may be combined with sensor data indicating frequent slipping or low traction to determine that the vehicle 108 is traveling on a snow-covered or icy road.

The controller 204 may process the sensor data, the communication data, and the settings or configuration information to determine whether an incident has occurred (block 410). As used herein, an "incident" is an occurrence during operation of an autonomous vehicle outside of normal safe operating conditions, such that one or more of the following occurs: (i) there is an interruption of ordinary vehicle operation, (ii) there is damage to the vehicle or other property, (iii) there is injury to a person, (iv) the conditions require action to be taken by a vehicle operator, autonomous operation feature, pedestrian, or other party to avoid damage or injury, and/or (v) an anomalous condition is detected that requires an adjustment outside of ordinary vehicle operation. Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources. Incidents may also include accidents, vehicle breakdowns, flat tires, empty fuel tanks, or medical emergencies. Incidents may further include identification of construction requiring the vehicle to detour or stop, hazardous conditions (e.g., fog or road ice), or other anomalous environmental conditions.

In some embodiments, the controller 204 may anticipate or project an expected incident based upon sensor or external data, allowing the controller 204 to send control signals to minimize the negative effects of the incident. For example, the controller 204 may cause the vehicle 108 to slow and move to the shoulder of a road immediately before running out of fuel. As another example, adjustable seats within the vehicle 108 may be adjusted to better position vehicle occupants in anticipation of a collision, windows may be opened or closed, or airbags may be deployed.

When an incident is determined to have occurred (block 412), information regarding the incident and the vehicle status may be recorded (block 414), either in the data storage 228 or the database 146. The information recorded may include sensor data, communication data, and settings or configuration information prior to, during, and immediately following the incident. In some embodiments, a preliminary determination of fault may also be produced and stored. The information may further include a determination of whether the vehicle 108 has continued operating (either autonomously or manually) or whether the vehicle 108 is capable of continuing to operate in compliance with applicable safety and legal requirements. If the controller 204 determines that the vehicle 108 has discontinued operation or is unable to continue operation (block 416), the method 400 may terminate. If the vehicle 108 continues operation, then the method 400 may continue as described below with reference to block 418.

Figure 4B:
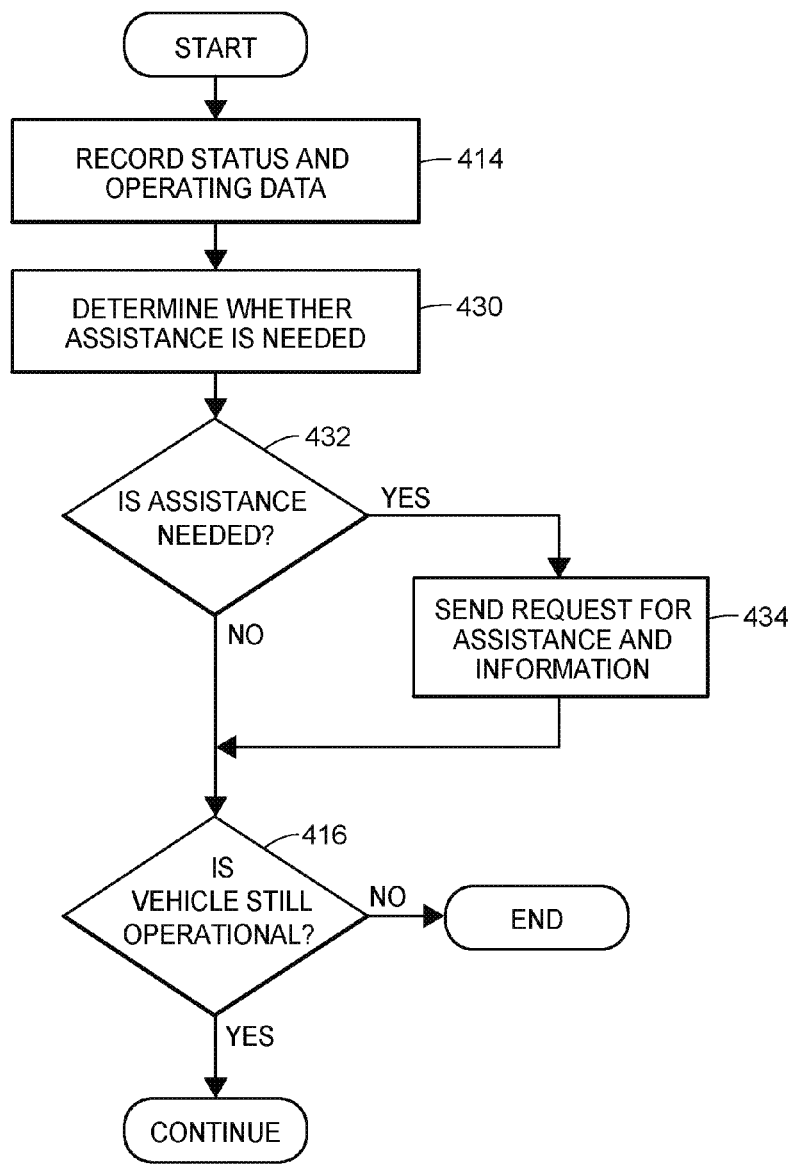

FIG. 4B illustrates an alternative portion of the method 400 following an incident. When an incident is determined to have occurred (block 412), the controller 204 or the server 140 may record status and operating information (block 414), as above. In some instances, the incident may interrupt communication between the vehicle 108 and the server 140 via network 130, such that not all information typically recorded will be available for recordation and analysis by the server 140. Based upon the recorded data, the server 140 or the controller 204 may determine whether assistance may be needed at the location of the vehicle 108 (block 430). For example, the controller may determine that a head-on collision has occurred based upon sensor data (e.g., airbag deployment, automatic motor shut-off, LIDAR data indicating a collision, etc.) and may further determine based upon information regarding the speed of the vehicle 108 and other information that medical, police, and/or towing services will be necessary. The determination that assistance is needed may further include a determination of types of assistance needed (e.g., police, ambulance, fire, towing, vehicle maintenance, fuel delivery, etc.). This determination may include analysis of the type of incident, the sensor data regarding the incident (e.g., images from outward facing or inward facing cameras installed within the vehicle, identification of whether any passengers were present within the vehicle, determination of whether any pedestrians or passengers in other vehicles were involved in the incident, etc.). The determination of whether assistance is needed may further include information regarding the determined status of the vehicle 108.

In some embodiments, the determination regarding whether assistance is needed may be supplemented by a verification attempt, such as a phone call or communication through the on-board computer 114. Where the verification attempt indicates assistance is required or communication attempts fail, the server 140 or controller 204 would then determine that assistance is needed, as described above. For example, when assistance is determined to be needed following an accident involving the vehicle 108, the server 140 may direct an automatic telephone call to a mobile telephone number associated with the vehicle 108 or the vehicle operator. If no response is received, or if the respondent indicates assistance is required, the server 140 may proceed to cause a request for assistance to be generated.

When assistance is determined to be needed (block 432), the controller 204 or the server 140 may send a request for assistance (block 434). The request may include information regarding the vehicle 108, such as the vehicle's location, the type of assistance required, other vehicles involved in the incident, pedestrians involved in the incident, vehicle operators or passengers involved in the incident, and/or other relevant information. The request for assistance may include telephonic, data, or other requests to one or more emergency or vehicular service providers (e.g., local police, fire departments, state highway patrols, emergency medical services, public or private ambulance services, hospitals, towing companies, roadside assistance services, vehicle rental services, local claims representative offices, etc.). After sending a request for assistance (block 434) or when assistance is determined not to be needed (block 432), the controller 204 or the server 140 may next determine whether the vehicle is operational (block 416), as described above. The method 400 may then end or continue as indicated in FIG. 4A.

In some embodiments, the controller 204 may further determine information regarding the likely cause of a collision or other incident. Alternatively, or additionally, the server 140 may receive information regarding an incident from the on-board computer 114 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

The controller 204 may determine whether a change or adjustment to one or more of the settings or configuration of the autonomous operation features has occurred (block 418). Changes to the settings may include enabling or disabling an autonomous operation feature or adjusting the feature's parameters (e.g., resetting the speed on an adaptive cruise control feature). For example, a vehicle operator may selectively enable or disable autonomous operation features such as automatic braking, lane centering, or even fully autonomous operation at different times. If the settings or configuration are determined to have changed, the new settings or configuration may be recorded (block 422), either in the data storage 228 or the database 146. For example, the Data Application may log autonomous operation feature use and changes in a log file, including timestamps associated with the features in use.

Next, the controller 204 may record the operating data relating to the vehicle 108 in the data storage 228 or communicate the operating data to the server 140 via the network 130 for recordation in the database 146 (block 424). The operating data may include the settings or configuration information, the sensor data, and/or the communication data discussed above. In some embodiments, operating data related to normal autonomous operation of the vehicle 108 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

The controller 204 may then determine whether operation of the vehicle 108 remains ongoing (block 426). In some embodiments, the method 400 may terminate when all autonomous operation features are disabled, in which case the controller 204 may determine whether any autonomous operation features remain enabled. When the vehicle 108 is determined to be operating (or operating with at least one autonomous operation feature enabled), the method 400 may continue through blocks 406-426 until vehicle operation has ended. When the vehicle 108 is determined to have ceased operating (or is operating without autonomous operation features enabled), the controller 204 may record the completion of operation (block 428), either in the data storage 228 or the database 146. In some embodiments, a second timestamp corresponding to the completion of vehicle operation may likewise be recorded, as above.

Exemplary Vehicle Action Communication Methods

Figure 5:
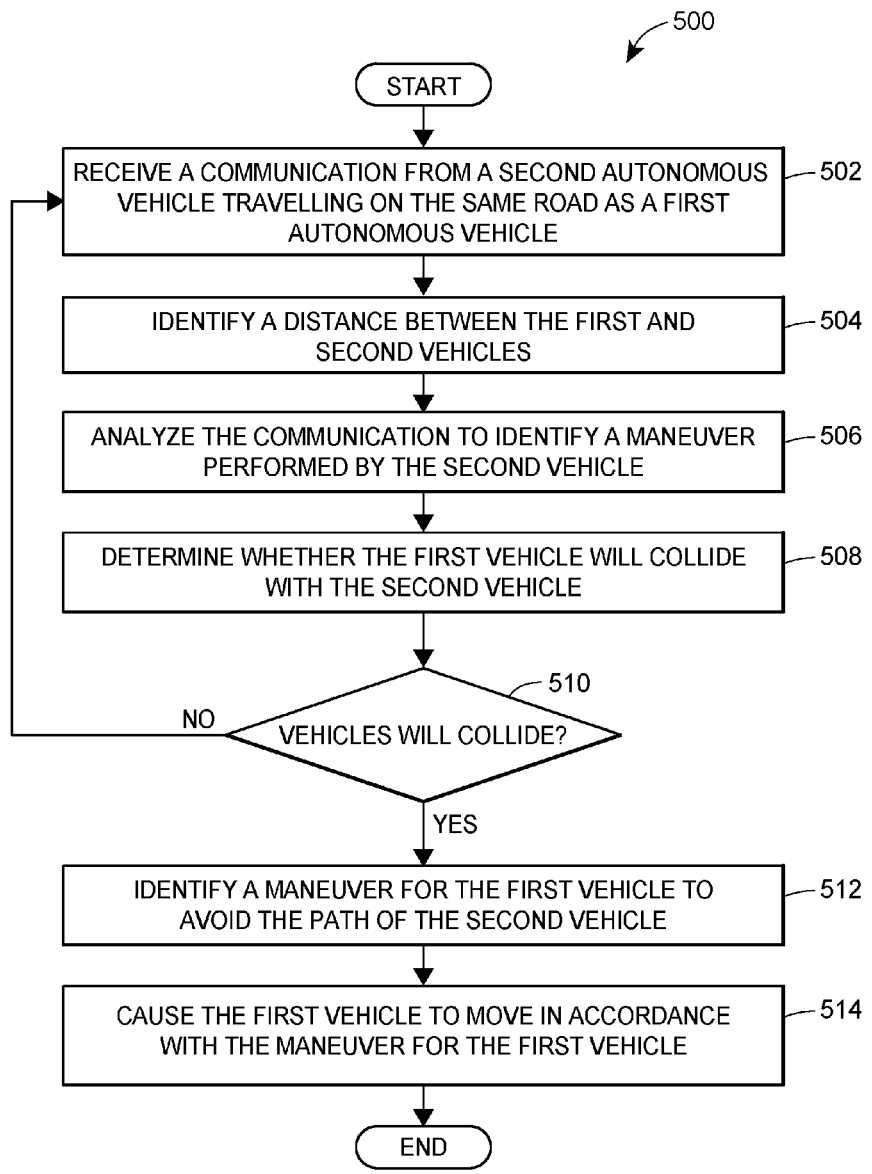
FIG. 5 illustrates a flow diagram of an exemplary vehicle action communication method for communicating upcoming maneuvers between autonomous vehicles.

FIG. 5 illustrates a flow diagram of an exemplary vehicle action communication method 500 for communicating upcoming maneuvers between autonomous vehicles 108, 182. In some embodiments, the vehicle action communication method 500 may be implemented on the on-board computer 114 or mobile device 110 in the vehicle 108. The vehicle 108 may be operating in a fully autonomous mode of operation without any control decisions being made by a vehicle operator, excluding navigation decisions such as selection of a destination or route. In some embodiments, the vehicle 108 may be operating without any passengers or with only passengers who are physically or legally unable to operate the vehicle 108 in a manual or semi-autonomous mode of operation (e.g., children, persons suffering acute illness, intoxicated or otherwise impaired persons, etc.). During manual vehicle operation or semi-autonomous vehicle operation, vehicle operators may perceive signals from other vehicles indicating their current or upcoming maneuvers (e.g., a turn or lane change signal, brake lights, reverse lights, etc.). However, many maneuvers do not have corresponding signals, such as speeding up, slowing down losing control of the vehicle, etc., and oftentimes vehicle operators do not use a signal when changing lanes or performing other maneuvers. Further, even when an appropriate signal is provided, vehicle operators may be slow to react to such signal or may be unable to weigh all of their options to identify the optimal reaction in a limited amount of time.

For example, when a vehicle in an adjacent lane signals a lane change into the vehicle operator's lane, the vehicle operator may recognize that the vehicles will collide if the lane change is performed. Because there is a car directly in front of the vehicle operator's vehicle, the vehicle operator may not be able to speed up to avoid the collision and instead may honk a horn to alert the other vehicle operator of the potential collision. While this may prevent the collision, honking the horn may not remove the risk entirely if the other vehicle operator does not hear the horn or does not react appropriately in response. The risk of a collision may be reduced more significantly if the vehicle operator moves into a third lane which is currently unoccupied. However, the vehicle operator may not have time to identify that the third lane is unoccupied before deciding how to react to the lane change signal. The vehicle action communication method 500 addresses these issues.

The vehicle action communication method 500 may begin by receiving a communication from a second autonomous vehicle 182 (block 502), travelling on the same road as the first autonomous vehicle 108. A distance may be identified between the vehicles 108, 182 (block 504) as well as the current speeds of the vehicles 108, 182, and the communication may be analyzed to identify an upcoming maneuver which will be performed by the second autonomous vehicle 182 (block 506). Based upon the upcoming maneuver for the second autonomous vehicle 182, the distance between the vehicles 108, 182, and/or the current speeds of the vehicles 108, 182, the on-board computer 114 in the first autonomous vehicle 108 may determine whether the vehicles 108, 182 will collide (block 508). If the vehicles 108, 182 will collide (block 510), a maneuver is identified for the first autonomous vehicle 108 to avoid a path of the second autonomous vehicle 182 (block 512). The on-board computer 114 may then cause the first autonomous vehicle 108 to move in accordance with the identified maneuver to avoid the second autonomous vehicle 182 (block 514). Although the method 500 is described with reference to the on-board computer 114 for simplicity, the described method may be easily modified for implementation by other systems or devices, including one or more of mobile devices 110 and/or servers 140.

At block 502, the on-board computer 114 of the first autonomous vehicle 108 may receive a communication from the second autonomous vehicle 182. The second autonomous vehicle 182 may broadcast the communication, via a V2V wireless communication protocol, to all vehicles within a predetermined communication range (e.g., 50 feet, 100 feet, 200 feet, etc.) of the second autonomous vehicle 182 and/or travelling on the same road as the second autonomous vehicle 182. In some scenarios, the receiving vehicles within the predetermined communication range of the second autonomous vehicle 182 may re-broadcast the communication to several other vehicles within a predetermined communication range of the receiving vehicles. For example, when the second autonomous vehicle 182 broadcasts a communication indicating that the second autonomous vehicle 182 is travelling at high speeds due to an emergency, the receiving vehicles may re-broadcast the communication so that vehicles up ahead may be alerted of the emergency and/or pull over.

The communication may include identification information for the second autonomous vehicle 182, such as the make, model, and year of the second autonomous vehicle 182, a vehicle identification number (VIN) for the second autonomous vehicle 182, or any other suitable identification information. In some embodiments, the communication may also include an indication of the type of vehicle, such as an emergency vehicle, police car, truck, school bus, etc. Moreover, the communication may include an indication of the number of passengers within the second autonomous vehicle 182 and/or respective locations of the passengers (e.g., driver's side, passenger side, front seat, back seat, etc.).

The communication may also include an indication of the location of the second autonomous vehicle 182, which may be a street address, an intersection, a set of GPS coordinates, etc. In some embodiments, the on-board computer 114 may determine the location of the second autonomous vehicle 182 by determining the current location of the first autonomous vehicle 108 using a GPS unit for example, and determining the distance between the vehicles 108, 182 based upon a received signal strength (RSSI) of the communication and/or a direction from which the communication was transmitted (e.g., via a directional antenna within the communication component 122).

Furthermore, the communication may include an indication of an upcoming maneuver to be performed by the second autonomous vehicle 182. The maneuver may be a lane change into or out of the lane currently occupied by the first autonomous vehicle 108. The maneuver may also be slowing down in response to an upcoming traffic signal, travelling at high speeds due to an emergency, a turn at an upcoming intersection, a series of lane changes to exit a highway, a merge onto a highway, and/or moving in reverse. In some scenarios, the maneuver may be a loss of control event, such as an uncontrolled vehicle movement or a failure experienced by one of the autonomous operation features in the second autonomous vehicle 182.

In some embodiments, the communication may include sensor data from the second autonomous vehicle 182, such as a vehicle speed, vehicle acceleration, vehicle orientation, etc., at one or several times before and/or during the communication.

Moreover, in some scenarios the communication may include a requested maneuver for the first autonomous vehicle 108 to perform in response to the upcoming maneuver for the second autonomous vehicle 182. For example, when the second autonomous vehicle 182 broadcasts a communication indicating that the second autonomous vehicle 182 is travelling at high speeds due to an emergency, the communication may include a request for all vehicles in front of the second autonomous vehicle 182 to pull over into the left lane. In this manner, the right lane may be clear and the second autonomous vehicle 182 may travel at very high speeds without risking a collision.

As mentioned above, the receiving vehicles may re-broadcast the communication to vehicles further in front, which may in turn re-broadcast the communication so that the second autonomous vehicle 182 has a clear path to the destination (e.g., a hospital, a crime scene, a burning building, etc.). In some embodiments, the communication may include an indication of the destination and/or of the route so that the communication may be re-broadcasted to vehicles further ahead along the route of the second autonomous vehicle 182.

At block 504, the on-board computer 114 may identify a distance between the first autonomous vehicle 108 and the second autonomous vehicle 182. For example, as mentioned above, the communication may include a location of the second autonomous vehicle 182. The on-board computer 114 may compare the received location to a current location of the first autonomous vehicle 108, as determined by the GPS unit to identify the distance between the vehicles 108, 182. In another example, the distance between the vehicles 108, 182 may be determined based upon the RSSI of the communication.

The on-board computer 114 may also identify the current speeds of the vehicles 108, 182 via sensors within the vehicle 108 and the communication, respectively. In some embodiments, the on-board computer 114 may identify additional sensor data for the vehicles 108, 182 such as accelerations, orientations, etc.

At block 506, the on-board computer 114 may analyze the communication to identify an upcoming maneuver to be performed by the second autonomous vehicle 182. As mentioned above, the communication may include an indication of an upcoming maneuver to be performed by the second autonomous vehicle 182. The on-board computer 114 may parse the communication to identify the maneuver.

At block 508, based upon the upcoming maneuver for the second autonomous vehicle 182, the distance between the vehicles 108, 182, and/or the current speeds of the vehicles 108, 182, the on-board computer 114 in the first autonomous vehicle 108 may determine whether the vehicles 108, 182 will collide. In some embodiments, the on-board computer 114 may utilize additional sensor data, such as the accelerations, orientations, etc., of the vehicles 108, 182 to determine whether the vehicles 108, 182 will collide.

Also in some embodiments, the on-board computer 114 may identify an amount of time until a collision is expected. In this manner, when there is a significant amount of time until the collision is expected, the first autonomous vehicle 108 may have time to wait until there is room in other lanes before making a corresponding maneuver. On the other hand, when a collision is expected to occur momentarily (e.g., within two seconds, five seconds, ten seconds, etc.), the first autonomous vehicle 108 may need to make an immediate maneuver to avoid the collision.

For example, the second autonomous vehicle 182 may be in an adjacent lane to the first autonomous vehicle 108 (e.g., as determined based upon the locations of the respective vehicles 108, 182 and/or the distance between them and the direction from which the communication came). The upcoming maneuver may be a lane change into the vehicle's lane. Moreover, the vehicles 108, 182 may be travelling at the same speed or within a predetermined threshold speed of each other (e.g., five miles per hour (mph)), and/or may be within a predetermined threshold distance of each other along the path of the road (e.g., 10 feet, 30 feet, 50 feet, 100 feet, etc.). Accordingly, the on-board computer 114 may determine that the vehicles 108, 182 will collide when the second autonomous vehicle 182 maneuvers into the first autonomous vehicle's lane.

In another example, the second autonomous vehicle 182 may be in the same lane as the first autonomous vehicle 108 and directly in front of the first autonomous vehicle 108 (e.g., as determined based upon the locations of the respective vehicles 108, 182 and/or the distance between them and the direction from which the communication came). The upcoming maneuver may be to slow down at a rate of five mph every second. The first autonomous vehicle 108 may be travelling faster than the second autonomous vehicle 182 and/or the vehicles 108, 182 may be within a predetermined threshold distance of each other along the path of the road (e.g., 10 feet, 30 feet, 50 feet, 100 feet, etc.). Accordingly, the on-board computer 114 may determine that the vehicles 108, 182 will collide within three seconds as the second autonomous vehicle 182 slows down.

If the vehicles 108, 182 will not collide, the first autonomous vehicle 108 may continue travelling on the previous route without an additional maneuver. On the other hand, if the vehicles 108, 182 will collide, the on-board computer 114 may identify a maneuver for the first autonomous vehicle 108 to avoid the path of the second vehicle 182 (block 512).

At block 512, a maneuver is identified to avoid the path of the second autonomous vehicle 182. The maneuver may include speeding up, slowing down, pulling over, changing lanes, turning, reversing, and/or any other suitable maneuver to avoid the path of the second autonomous vehicle 182. In some embodiments, the communication from the second autonomous vehicle 182 may provide a requested maneuver for the first autonomous vehicle 108 to perform. In other embodiments, the on-board computer identifies the maneuver for the first autonomous vehicle 108 to perform to avoid a collision.

In addition to avoiding the path of the second autonomous vehicle 182, the on-board computer 114 may receive communications identifying paths of other vehicles travelling on the same road and/or may identify the locations of the other vehicles on the same road. In this manner, the on-board computer 114 may identify whether the first autonomous vehicle 108 may speed up, slow down, move into an adjacent lane, etc., without colliding with any of the other vehicles.

For example, when the second autonomous vehicle 182 changes lanes into the first autonomous vehicle's lane which may result in a collision, the on-board computer 114 may determine that maneuvers including speeding up above a threshold speed, slowing down below a threshold speed, and/or moving into an adjacent lane may be used to successfully avoid the collision. The on-board computer 114 may then determine that the adjacent lanes are occupied. Additionally, the on-board computer 114 may determine that if the first autonomous vehicle 108 accelerates to reach the threshold speed, the first autonomous vehicle 108 will collide with a vehicle in front. As a result, the on-board computer 114 may determine that the optimal maneuver is to slow down below the threshold speed.

In some embodiments, for example, when the second autonomous vehicle 182 broadcasts a loss of control event or an emergency, the on-board computer 114 may identify a maneuver that will cause the first autonomous vehicle 108 to stay more than a threshold distance from the second autonomous vehicle 182. More specifically, if the second autonomous vehicle 182 broadcasts a loss of control event in the same lane as the first autonomous vehicle 108, the first autonomous vehicle 108 may move two or more lanes over, may turn onto another road, and/or may slow down below a threshold speed to stay more than a threshold distance from the second autonomous vehicle 182. Additionally, when the second autonomous vehicle 182 broadcasts an emergency communication, the on-board computer 114 may re-broadcast the communication to vehicles in front of the first autonomous vehicle 108 which are further away from the second autonomous vehicle 182 than the first autonomous vehicle 108. In this manner, a path may be cleared for the second autonomous vehicle 182 so that the emergency may be addressed quickly and efficiently.

In some scenarios, the on-board computer 114 may determine that a collision with the second autonomous vehicle 182 is imminent and/or unavoidable. In this scenario, the on-board computer 114 may determine which of the vehicles 108, 182 includes passengers. For example, as mentioned above, the communication received from the second autonomous vehicle 182 may include an indication of the number of passengers in the second autonomous vehicle 182. Additionally, the on-board computer 114 may communicate with sensors within the first autonomous vehicle 108, such as cameras, microphones, pressure sensors, thermometers, or similar sensors to determine the number of passengers within the first autonomous vehicle 108.

When the second autonomous vehicle 182 includes passengers and the first autonomous vehicle 108 does not include passengers, the on-board computer 114 may determine that the maneuver for the first autonomous vehicle 108 is to veer off the road to avoid a collision with a vehicle which contains passengers. On the other hand, when the first autonomous vehicle 108 includes passengers and the second autonomous vehicle 182 does not include passengers, the on-board computer 114 may identify a maneuver which causes the vehicles to collide. However, the impact may occur at a portion of the first autonomous vehicle 108 where the passengers are not located. For example, if the second autonomous vehicle 182 changes lane into the vehicle's lane, and the passengers are located in the back seat, the on-board computer 114 may identify slowing down as the maneuver, so that even though the vehicles 108, 182 will still collide, the impact occurs at the front of the first autonomous vehicle 108 where the passengers are not located.

At block 514, the on-board computer 114 may cause the first autonomous vehicle 108 to move in accordance with the identified maneuver. For example, as described above, the on-board computer 114 may directly or indirectly control the operation of the first autonomous vehicle 108 according to various autonomous operation features. The autonomous operation features may include software applications or modules implemented by the on-board computer 114 to generate and implement control commands to control the steering, braking, or throttle of the first autonomous vehicle 108. When a control command is generated by the on-board computer 114, it may thus be communicated to the control components of the first autonomous vehicle 108 to effect a control action. The on-board computer 114 may generate control commands to brake, accelerate, steer into another lane, turn onto another road, etc.

Exemplary Vehicle Path Coordination Methods

Figure 6:
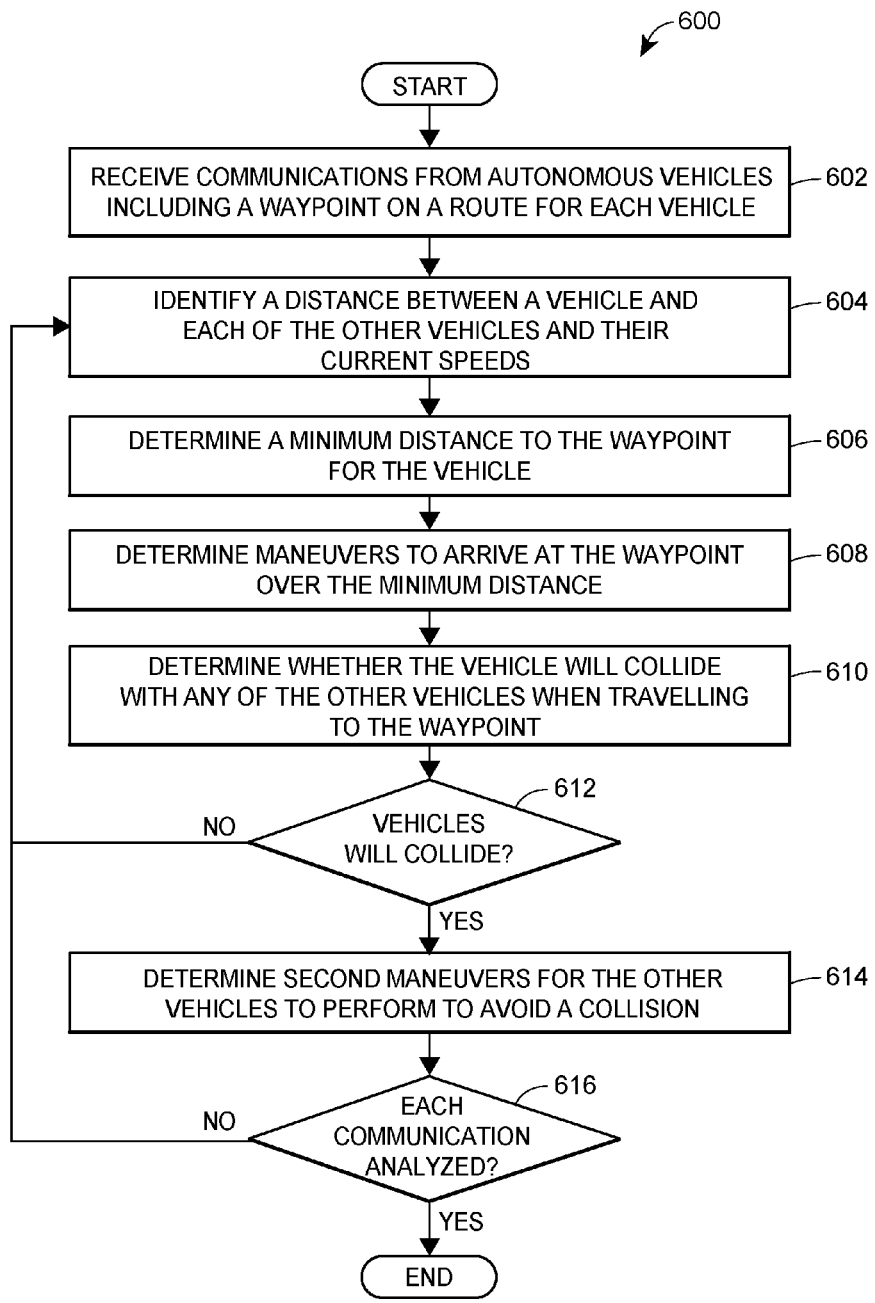
FIG. 6 illustrates a flow diagram of an exemplary vehicle path coordination method for identifying optimal paths for several autonomous vehicles travelling on the same road.

FIG. 6 illustrates a flow diagram of an exemplary vehicle path coordination method 600 for identifying optimal paths for several autonomous vehicles travelling on the same road. In some embodiments, the vehicle path coordination method 600 may be implemented on a server 140 and/or other external computing device 186. The server 140 may receive communications from vehicles 182.1-182.N which may be operating in a fully autonomous mode of operation (autonomous mode) without any control decisions being made by a vehicle operator, excluding navigation decisions such as selection of a destination or route. In some embodiments, the vehicle 108 may be operating without any passengers or with only passengers who are physically or legally unable to operate the vehicle 108 in a manual or semi-autonomous mode of operation (manual mode) (e.g., children, persons suffering acute illness, intoxicated or otherwise impaired persons, etc.).

During manual vehicle operation, vehicle operators do not communicate their routes to other vehicle operators in advance. As a result, traffic jams may be created when one vehicle needs to move into a highway exit lane or a turn lane and other vehicles do not provide enough space for the vehicle to do so. Therefore, the method 600 may be used to increase the efficiency of vehicle routes and decrease the amount of time it takes for vehicles to reach their destinations.

The exemplary vehicle path coordination method 600 may begin by receiving communications from several autonomous vehicles 182.1-182.N within a threshold distance of each other (block 602), where each communication includes a waypoint along a route for the corresponding vehicle. For each autonomous vehicle 182.1-182.N, the method 600 may include identifying a distance between the autonomous vehicle 182.1 and each of the other autonomous vehicles 182.2-182.N within the threshold distance as well as the current speeds of each of the autonomous vehicles 182.1-182.N (block 604). A minimum distance to the waypoint for the autonomous vehicle 182.1 may be identified (block 606), and the method 600 may include determining maneuvers which will cause the autonomous vehicle 182.1 to arrive at the waypoint over the minimum distance and/or a minimum amount of time (block 608). The method 600 may further include determining whether the autonomous vehicle 182.1 will collide with any of the other autonomous vehicles 182.2-182.N when travelling to the waypoint (block 610). If the autonomous vehicle 182.1 will not collide with any of the other autonomous vehicles 182.2-182.N, the autonomous vehicle 182.1 may perform the maneuvers which will cause the autonomous vehicle 182.1 to arrive at the waypoint over the minimum distance and/or a minimum amount of time. On the other hand, if the autonomous vehicle 182.1 will collide with other autonomous vehicles 182.2-182.N, the method 600 may include determining maneuvers for the other vehicles to perform to avoid a collision (block 614). If any of the autonomous vehicles 182.1-182.N have not been analyzed, then the process is repeated for the next autonomous vehicle (block 604) until all autonomous vehicles 182.1-182.N have been analyzed. Although the method 600 is described with reference to the server 140 for simplicity, the described method may be easily modified for implementation by other systems or devices, including another external computing device 186, an on-board computing device 114 and/or mobile device 110.

At block 602, the server 140 may receive communications from each of several autonomous vehicles 182.1-182.N travelling on the same road and/or within a predetermined threshold distance of each other. The communications may be transmitted to the server 140 via the network 130.

Each communication may include identification information for the corresponding autonomous vehicle 182.1-182.N, such as the make, model, and year of the autonomous vehicle 182.1-182.N, a vehicle identification number (VIN) for the autonomous vehicle 182.1-182.N, or any other suitable identification information. In some embodiments, the communication may also include an indication of the type of vehicle, such as an emergency vehicle, police car, truck, school bus, etc. Moreover, the communication may include an indication of the number of passengers within the autonomous vehicle 182.1-182.N and/or respective locations of the passengers (e.g., driver's side, passenger side, front seat, back seat, etc.). The communication may also include an indication of the location of the autonomous vehicle 182.1-182.N, which may be a street address, an intersection, a set of GPS coordinates, etc.

In some embodiments, the communication may include sensor data from the autonomous vehicle 182.1-182.N, such as a vehicle speed, vehicle acceleration, vehicle orientation, etc., at one or several times before and/or during the communication.

Furthermore, the communication may include an indication of a waypoint on a route for the autonomous vehicle 182.1-182.N. The waypoint may be the next waypoint on the autonomous vehicle's route. For example, when the autonomous vehicle 182.1-182.N travels from a starting location to a destination, a set of navigation directions may be generated to direct the autonomous vehicle 182.1-182.N to the destination. The set of navigation directions may include several waypoints, where the autonomous vehicle is instructed to perform a maneuver at each waypoint (e.g., turn left, turn right, exit the highway, merge onto the highway, arrive at the destination, etc.). Accordingly, the communication may include the next waypoint corresponding to an upcoming maneuver for the autonomous vehicle 182.1-182.N. In other embodiments, the communication may include the next waypoint on the autonomous vehicle's route which is the destination, a highway exit, and/or a highway entrance. In this manner, the server 140 may for example, receive indications of several highway exits for several autonomous vehicles on the same highway and/or within a predetermined threshold distance of each other.

The server 140 may then identify optimal paths for each autonomous vehicle 182.1-182.N, so that the autonomous vehicle reaches the highway exit in the shortest amount of time. In some embodiments, the optimal paths may be identified using graph theory and/or graph data structures. For example, waypoints may be represented by vertices and the path between waypoints may be represented as edges. The distance between two waypoints for an edge may be represented as a cost, and the server 140 may identify paths for each autonomous vehicle 182.1-182.N which minimizes the cost to the waypoint. In some embodiments, the server 140 may identify paths for each autonomous vehicle 182.1-182.N which minimizes the total cost for each of the autonomous vehicles 182.1-182.N to travel to their respective waypoints. Also, in some embodiments, the cost may be adjusted based upon whether the path is blocked by another vehicle. More specifically, there may be an additional cost to going around the other vehicle and/or waiting for other vehicles to move.

For example, three autonomous vehicles 182.1-182.3 may be within a mile of each other on the same highway. The first autonomous vehicle 182.1 may be exiting the highway at the next exit one mile ahead, the second autonomous vehicle 182.2 may be exiting the highway at an exit two miles ahead, and the third autonomous vehicle 182.3 may be exiting the highway at an exit three miles ahead. Accordingly, the server 140 may direct the first autonomous vehicle 182.1 to move into the right lane, the second autonomous vehicle 182.2 to move into the center lane, and the third autonomous vehicle 182.3 to move into the left lane, so that each vehicle may exit the highway without blocking the path of the other two vehicles.

In some embodiments, the communication may include an indication of an emergency, such as a fire, crime scene, patient who needs to be taken to the hospital, etc. Accordingly, the server 140 may direct each of the other autonomous vehicles 182.2-182.N travelling along the route of the emergency vehicle to get out of the way of the emergency vehicle.

For each of the autonomous vehicles 182.1-182.N, at block 604, the server 140 may identify a distance between the autonomous vehicle 182.1 and the other autonomous vehicles 182.2-182.N. For example, as mentioned above, the received communications may include locations of the autonomous vehicles 182.1-182.N. The server 140 may compare the locations to identify distances between the autonomous vehicle 182.1 and the other autonomous vehicles 182.2-182.N. The server 140 may also identify the current speeds of the autonomous vehicles 182.1-182.N via the communications.

The server 140 may then determine a minimum distance to the waypoint included in the communication from the autonomous vehicle 182.1 (block 606) and/or determine one or several maneuvers to arrive at the waypoint over the minimum distance and/or a minimum amount of time (block 608). The minimum distance may be a minimum distance to the waypoint while travelling along the road and obeying traffic laws (e.g., travelling in the appropriate lanes, staying within the lane markers, turning from the appropriate lanes, etc.). For example, the waypoint may be a highway exit where the exit ramp is on the right side of the highway and the autonomous vehicle 182.1 is in the left lane. The minimum distance to the highway exit may be a straight line to the highway exit while staying within the lane markers, which may require lane changes from the left lane to the center lane and from the center lane to the right lane before exiting the highway. The timing of the lane changes may not affect the distance as long as both lane changes occur before the autonomous vehicle 182.1 reaches the highway exit.

At block 610, the server 140 may determine whether the autonomous vehicle 182.1 will collide with any of the other autonomous vehicles 182.2-182.N when travelling to the waypoint using maneuvers corresponding to the minimum distance. The server 140 may utilize the distances between the autonomous vehicle 182.1 and each of the other autonomous vehicles 182.2-182.N, the current speeds of the autonomous vehicles 182.1-182.N, and/or additional sensor data, such as accelerations, orientations, etc., of the autonomous vehicles 182.1-182.N to determine whether the autonomous vehicle 182.1 will collide with any of the other autonomous vehicles 182.2-182.N. In some embodiments, the server 140 may determine whether the autonomous vehicle 182.1 will collide with any of the other autonomous vehicles 182.2-182.N, while the autonomous vehicle 182.1 maintains its current speed, travels at the speed limit, and/or travels at a predetermined threshold speed. In this manner, the server 140 may determine an optimal path for the autonomous vehicle 182.1 while travelling at an optimal or maximum speed to minimize the amount of time to the waypoint.

In some embodiments, when the autonomous vehicle 182.1 will collide with one of the other autonomous vehicles 182.2-182.N and the timing of maneuvers does not affect the minimum distance, the server 140 may adjust the timing of the maneuvers. Continuing the example above, initially the server 140 may direct the autonomous vehicle 182.1 to make a lane change to the center lane after travelling one mile and a lane change into the right lane after travelling two miles. If the server 140 determines that the autonomous vehicle 182.1, while maintaining its current speed, will collide with another vehicle in the left lane after half a mile but the center lane is mostly empty, the server 140 may adjust the timing of the maneuvers so that the autonomous vehicle 182.1 is directed to move into the center lane right away and then into the right lane after travelling two miles.

The autonomous vehicle 182.1 may be directed to travel to the waypoint using the maneuvers which correspond to the minimum distance and/or a minimum amount of time. If the autonomous vehicles 182.1-182.N will not collide, the server 140 may determine whether each of the autonomous vehicles 181.1-182.N have been analyzed (block 616). If not, the server 140 may analyze and/or determine maneuvers for the next autonomous vehicle 182.2 to arrive at a corresponding waypoint over a minimum distance (block 604).

On the other hand, if the autonomous vehicle 182.1 will collide with any of the other autonomous vehicles 182.2-182.N, the server 140 may determine second sets of maneuvers for the other autonomous vehicles 182.2-182.N to avoid the path of the autonomous vehicle 182.1 (block 614). In some embodiments, the server 140 may identify second sets of maneuvers for each autonomous vehicle which is directly in front of, behind, or immediately adjacent to the autonomous vehicle 182.1. Then, the server 140 may work outwards and identify second sets of maneuvers for autonomous vehicles further away from the autonomous vehicle 182.1. Maneuvers within the second sets of maneuvers may include speeding up, slowing down, pulling over, changing lanes, turning, reversing, and/or any other suitable maneuver. Also in some embodiments, the server 140 may identify second sets of maneuvers for the other autonomous vehicles 182.2-182.N to evenly distribute the other autonomous vehicles 182.2-182.N across several lanes. In this manner, each lane has the same amount of traffic and one lane is not more crowded than the others.

For example, the server 140 may determine that the autonomous vehicle 182.1 may collide with another autonomous vehicle 182.2 in the same lane which is directly in front of the autonomous vehicle 182.1, when the autonomous vehicle 182.1 is travelling at the current speed and/or using maneuvers which correspond to the minimum distance. Accordingly, the server 140 may determine a second set of maneuvers for the other autonomous vehicle 182.2 which includes a lane change out of the lane of the autonomous vehicle 182.1. Each of the second sets of maneuvers may be transmitted to the respective autonomous vehicles 182.2-182.N for the autonomous vehicles 182.2-182.N to traverse according to a respective second set of maneuvers.

In another example, the server 140 may direct an autonomous vehicle 182.1 travelling in an emergency to move into the right lane and continue along the highway until reaching the waypoint (a highway exit). To avoid the path of the autonomous vehicle 182.1, the server 140 may direct each of the other autonomous vehicles 182.2-182.N to pull over onto the shoulder adjacent to the left lane to provide an open pathway for the autonomous vehicle 182.1.

At block 616, the server 140 may determine whether each of the communications corresponding to each of the autonomous vehicles 182.1-182.N have been analyzed. If not, the server 140 may analyze and/or determine maneuvers for the next autonomous vehicle 182.2 to arrive at a corresponding waypoint over a minimum distance (block 604). In some embodiments, the minimum distance and/or a minimum amount of time to the waypoint may be adjusted according to the second set of maneuvers for the next autonomous vehicle 182.2 to avoid the path of the first or a previously evaluated autonomous vehicle 182.1. For example, in an earlier iteration, the next autonomous vehicle 182.2 may be directed to maneuver into the left lane to avoid a collision with the first autonomous vehicle 182.1. The minimum distance to the waypoint for the next autonomous vehicle 182.2 may be the minimum distance to the waypoint including the distance involved while moving to the left lane. More specifically, the minimum distance to a highway exit on the right side may include the distance travelled moving to the left lane and then moving from the left lane to the center lane, from the center lane to the right lane, and/or from the right lane to the highway exit.

As a result, in some embodiments, the first autonomous vehicle 182.1 that is evaluated by the server 140 may be directed to a corresponding waypoint without taking into account any second sets of maneuvers to be performed to avoid collisions with other autonomous vehicles. Each subsequent autonomous 182.2-182.N that is evaluated by the server 140 may be directed to a corresponding waypoint, where at least some of the maneuvers to the corresponding waypoint are from a second set of maneuvers to avoid a collision with a previously evaluated autonomous vehicle. The maneuvers to the corresponding waypoint may include an aggregation of second sets of maneuvers for the autonomous vehicle to avoid collisions with previously evaluated autonomous vehicles.

In some embodiments, the order in which the autonomous vehicles 182.1-182.N are evaluated by the server 140 for path coordination may be determined according to a priority level. Each of the autonomous vehicles 182.1-182.N may be assigned a priority level and/or the autonomous vehicle 182.1-182.N having the highest priority level may be evaluated first, the autonomous vehicle 182.1-182.N having the second highest priority level may be evaluated second, and so on. In some embodiments, priority level may be assigned based upon the distance to the corresponding waypoint for an autonomous vehicle 182.1-182.N. For example, three autonomous vehicles 182.1-182.3 may be travelling on the same highway, each having a corresponding waypoint at a different highway exit. The autonomous vehicle 182.1 with a corresponding waypoint at the closest highway exit may be assigned the highest priority level and/or the autonomous vehicle 182.3 with a corresponding waypoint at the farthest highway exit may be assigned the lowest priority level.

As a result, the first autonomous vehicle 182.1 with the highest priority level may be evaluated first. The server 140 may direct the first autonomous vehicle 182.1 with the highest priority level to move into the right lane and keep going straight until the autonomous vehicle 182.1 reaches a first highway exit. The server 140 may also direct the other autonomous vehicles 182.2-182.3 to move into the center and left lanes respectively to avoid a collision with the first autonomous vehicle 182.1. The second autonomous vehicle 182.2 having the second highest priority level may be directed to continue in the center lane until the first autonomous vehicle 182.1 exits the highway and then to maneuver into the right lane before exiting the highway at a second highway exit. The third autonomous vehicle 182.3 having the lowest priority level may be directed to continue in the left lane until the second autonomous vehicle 182.2 moves into the right lane and at that point, the third autonomous vehicle 182.3 may be directed to maneuver into the center lane. When the second autonomous vehicle 182.2 exits the highway, the third autonomous vehicle 182.3 may be directed to maneuver into the right lane before exiting the highway at a third highway exit.

In some embodiments, the server 140 may cause each of the autonomous vehicles 182.1-182.N to move in accordance with the maneuvers assigned to the respective autonomous vehicle. This may include the second sets of maneuvers for the autonomous vehicle to avoid collisions with other autonomous vehicles and/or maneuvers to travel to a corresponding waypoint over a minimum distance. To move in accordance with the maneuvers assigned to the respective autonomous vehicle, the server 140 may direct the on-board computer 114 and/or mobile device 110 within the autonomous vehicle to directly or indirectly control the operation of the autonomous vehicle in accordance with various autonomous operation features. The autonomous operation features may include software applications or modules implemented by the on-board computer 114 to generate and implement control commands to control the steering, braking, or throttle of the autonomous vehicle.

Exemplary Signal Control Methods

FIG. 7 illustrates a flow diagram of an exemplary signal control method 700 for presenting a vehicle signal from an autonomous vehicle indicative of an upcoming maneuver. In some embodiments, the signal control method 700 may be implemented on the on-board computer 114 or mobile device 110 in the vehicle 108. The vehicle 108 may be operating in a fully autonomous mode of operation without any control decisions being made by a vehicle operator, excluding navigation decisions such as selection of a destination or route.

Such method 700 may be used to provide signals which may be perceived by other autonomous or semi-autonomous vehicles, pedestrians, and/or vehicle operators. The signals may be provided in addition and/or as an alternative to communication signals which may be received by other autonomous or semi-autonomous vehicles. During autonomous vehicle operation, autonomous vehicles may communicate with each other over a V2V wireless communication protocol. The autonomous vehicles may communicate upcoming maneuvers, such as speeding up, slowing down, lane changes, turns, etc. However, when communication is unavailable (e.g., one of the autonomous vehicles cannot connect to the network, a network server is down, etc.), the autonomous vehicles may be unable to provide indications of upcoming maneuvers to each other. Moreover, vehicle operators in manually operated vehicles and/or pedestrians may be unaware of the upcoming maneuvers for other autonomous vehicles. The signal control method 700 addresses these issues.

The signal control method 700 may begin by determining an upcoming maneuver for an autonomous vehicle 108 (block 702). A vehicle signal indicative of the upcoming maneuver may be identified (block 704). The on-board computer 114 within the autonomous vehicle 108 may cause the autonomous vehicle 108 to present the vehicle signal (block 706) and/or cause the autonomous vehicle 108 to perform the maneuver corresponding to the vehicle signal (block 708). Although the method 700 is described with reference to the on-board computer 114 for simplicity, the described method may be easily modified for implementation by other systems or devices, including one or more of mobile devices 110 and/or servers 140.

At block 702, the on-board computer 114 of the autonomous vehicle 108 may determine an upcoming maneuver for the autonomous vehicle 108. For example, the upcoming maneuver may be in response to communications received from other autonomous vehicles 182.1-182.N to avoid a collision with the other autonomous vehicles. In other scenarios, the upcoming maneuver may be the next maneuver along a route for arriving at a particular destination. In yet another example, the upcoming maneuver may be in response to sensors within the autonomous vehicle 108 which detect other vehicles and/or objects on the road. More specifically, the upcoming maneuver may be to slow down and/or stop in response to detecting a traffic light, a stop sign, a vehicle slowing down or stopping in front of the autonomous vehicle 108, pedestrians crossing, etc. In addition to planned maneuvers, such as turning or changing lanes, maneuvers may also include unplanned maneuvers, such as losing control, swerving, etc. In this manner, vehicle operators, pedestrians, and/or other vehicles may be aware of vehicles which may be dangerous, out of control, and/or experiencing system failures.

In any event, maneuvers may include braking/slowing down, turning left or right, turning around, reversing, speeding up, changing lanes, merging, swerving to avoid a collision with another vehicle, losing control, and/or a system failure in one of the autonomous operation features.

At block 704, the on-board computer 114 may identify a vehicle signal indicative of the upcoming maneuver. For example, the on-board computer 114 may store a table of vehicle signals and the corresponding maneuvers which each signal indicates. In other embodiments, the server 140 may provide the table of vehicle signals and corresponding maneuvers to the on-board computer 114. Each vehicle signal may be perceived by an autonomous vehicle, vehicle operator, and/or pedestrian. Vehicle signals may include visible signals, such as brake lights, turn signals, reverse lights, flashing lights, etc., audible signals such as a honk, an audio message, or other alert, and/or electromagnetic signals outside of the visible light spectrum, such as an infrared signal, an ultraviolet signal, etc. The vehicle signals may not include wireless communications via a radio signal, for example. In some embodiments, electromagnetic signals outside of the visible light spectrum may be used as signals when visibility is poor. For example, in foggy conditions other vehicles may not detect brake lights from the autonomous vehicle 108. Accordingly, an infrared signal may be provided instead which may be more easily detectable in foggy conditions.

A vehicle signal may indicate that the vehicle is braking/slowing down, turning left or right, turning around, reversing, speeding up, changing lanes, merging, that another vehicle is travelling too close to the vehicle, moving or swerving to avoid a collision with another vehicle, that the vehicle is losing control, and/or a system failure in at least one of the autonomous operation features.

Each of the autonomous vehicles 182.1-182.N may include the same table of vehicle signals and corresponding maneuvers to decode an identified vehicle signal. For example, the vehicle signal may be identified via the sensors 120 within the autonomous vehicle 108. More specifically, the digital camera, the LIDAR sensor, and/or the infrared sensor may detect visible light signals (turn signals, brake lights, flashing lights, reverse lights, etc.) and/or other electromagnetic signals outside of the visible light spectrum (infrared signals, ultraviolet signals, etc.). A microphone within the autonomous vehicle 108 may detect audible signals. The on-board computer 114 may then compare the vehicle signal identified from another autonomous vehicle 182.1-182.N to the table of vehicle signals to decode the vehicle signal and/or identify a corresponding maneuver. Additionally, vehicle operators and/or pedestrians may perceive the vehicle signal and/or determine a corresponding maneuver.

In any event, at block 706, the on-board computer 114 may automatically cause the autonomous vehicle 108 to present the vehicle signal. For example, the on-board computer 114 may communicate a control command to the vehicle components which may produce the signal, such as speakers to produce an audio signal, tail lights or head lights to produce a visual signal, an infrared light emitting diode (LED) to produce an infrared signal, etc. More specifically, the on-board computer 114 may communicate a control command to a turn signal light to turn on and off once per second, for example.

An exemplary vehicle signal may include flashing the head or tail lights to warn a vehicle behind the autonomous vehicle 108 of an impending collision. The on-board computer 114 may present this vehicle signal when the autonomous vehicle 108 is about to collide with another vehicle. In this manner, the vehicle behind the autonomous vehicle 108 may be made aware of two colliding vehicles up ahead and may pull over, change lanes, turn onto another road, etc. Additionally, the on-board computer 114 may present this vehicle signal when the vehicle behind the autonomous vehicle 108 is driving too closely behind the autonomous vehicle 108, which may result in a rear end collision with the autonomous vehicle 108. By flashing the head lights or tail lights, the on-board computer 114 may signal to the other vehicle to slow down to avoid a collision. The on-board computer 114 may also cause a horn to honk in the autonomous vehicle 108, a siren to go off, and/or any other suitable alarming sound via the speakers within the autonomous vehicle 108 to signal an impeding collision to the vehicle behind the autonomous vehicle 108.

Another exemplary vehicle signal may include flashing hazard lights to signal that the autonomous vehicle 108 is losing control and/or a system failure has occurred in at least one of the autonomous operation features. In response, vehicles nearby may pull over, change lanes to avoid the autonomous vehicle 108, move over several lanes to keep a safe distance from the autonomous vehicle 108, speed up or slow down to keep a safe distance from the autonomous vehicle 108, turn off the road, etc. Additionally, the other vehicles may call emergency road services to help the autonomous vehicle 108. In some embodiments, different vehicle signals may signal different types of malfunctions. For example, the frequency at which the hazard lights are flashed may be indicative of the type of malfunction. When the hazard lights are flashed several times per second, the autonomous vehicle 108 may be losing control and/or when the hazard lights are flashed once per second or once every several seconds, a system failure may have occurred in an autonomous operation feature. An electromagnetic signal outside of the visible light spectrum may be presented to specify which autonomous operation feature is malfunctioning. However, these are merely exemplary vehicle signals for ease of illustration and are not meant to be limiting. Any suitable vehicle signal may be used to signal any suitable maneuver.

In some embodiments, the on-board computer 114 may cause the autonomous vehicle 108 to present the vehicle signal indicating the upcoming maneuver at the same time as the on-board computer 114 transmits a communication (e.g., via a V2V wireless communication protocol) which also indicates the upcoming maneuver. In this manner, an additional warning of the upcoming maneuver is provided as backup for when communication breaks down. Moreover, the autonomous vehicles 182.1-182.N may receive the communication while pedestrians and/or semi-autonomous or manually operated vehicles which do not have communication capabilities may perceive the vehicle signal. In other embodiments, the on-board computer 114 may cause the autonomous vehicle 108 to present the vehicle signal indicating the upcoming maneuver just before or just after the on-board computer 114 transmits a communication (e.g., within a predetermined threshold time of the communication).

In additional or alternative embodiments, the on-board computer 114 may transmit the communication indicating the upcoming maneuver to another autonomous vehicle 182. When an acknowledgement of the communication is not received from the other autonomous vehicle 182, the on-board computer 114 may cause the autonomous vehicle 108 to present the vehicle signal. For example, if an acknowledgement of the communication is not received within a predetermined threshold time (e.g., 10 seconds, 30 seconds, a minute, etc.) of the communication, the on-board computer 114 may cause the autonomous vehicle 108 to present the vehicle signal.

In yet other embodiments, the on-board computer 114 may cause the autonomous vehicle 108 to present the vehicle signal when the autonomous vehicle 108 is unable to transmit communications to other autonomous vehicles, semi-autonomous vehicles, and/or manually operated vehicles. For example, the autonomous vehicle 108 and/or the other vehicles may not include wireless communication capabilities, may be unable to connect to the network 130, may be unable to establish a V2V communication link, and/or may be unable to communicate with a server which relays communications between the vehicles.

After the autonomous vehicle 108 presents the vehicle signal, at block 708, the on-board computer 114 may cause the autonomous vehicle 108 to perform the upcoming maneuver corresponding to the vehicle signal. For example, as described above, the on-board computer 114 may directly or indirectly control the operation of the autonomous vehicle 108 according to various autonomous operation features. The autonomous operation features may include software applications or modules implemented by the on-board computer 114 to generate and implement control commands to control the steering, braking, or throttle of the autonomous vehicle 108. When a control command is generated by the on-board computer 114, it may thus be communicated to the control components of the vehicle 108 to effect a control action. The on-board computer 114 may generate control commands to brake, accelerate, steer into another lane, turn onto another road, etc.

Exemplary Autonomous Vehicle Crowdsourcing Methods

FIG. 8 illustrates a flow diagram of an exemplary autonomous vehicle crowdsourcing method 800 for presenting vehicle data regarding a road segment based upon data collected from several autonomous vehicles 182.1-182.N. The autonomous vehicles 182.1-182.N may be operating in a fully autonomous mode of operation without any control decisions being made by a vehicle operator, excluding navigation decisions such as selection of a destination or route. In some embodiments, the autonomous vehicles 182.1-182.N may include functionality to switch into a manual mode by for example, disabling the autonomous operation features. The autonomous vehicles 182.1-182.N may also include functionality to switch back into the autonomous mode by automatically enabling the autonomous operation features and/or enabling the autonomous operation features in response to a request by a vehicle operator. A vehicle operator may then take over operation of the autonomous vehicle 182.1-182.N in certain scenarios.

In some embodiments, the method 800 may be performed by a server 140 which communicates with the Data Application on the mobile device 110 within an autonomous vehicle 182.1-182.N. The Data Application may present the vehicle data regarding the road segment. For example, the Data Application may present the vehicle data on a display 202 of the mobile device 110. In other embodiments, the server 140 may communicate with the Data Application on the on-board computer 114. Although the method 800 is described with reference to the server 140 and the mobile device 110 for simplicity, the described method may be easily modified for implementation by other systems or devices, including any combination of one or more of on-board computers 114, mobile devices 110, and/or servers 140.

Such method 800 may be useful in providing vehicle operators and/or autonomous vehicles 182.1-182.N with detailed information regarding a vehicle environment (e.g., traffic, accidents, flooding, ice, etc.). For example, an accident up ahead may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the accident may be presented to the driver of vehicle 182.2.

The autonomous vehicle crowdsourcing method 800 may begin by receiving communications from several autonomous vehicles 182.1-182.N including data for the same road segment on which the autonomous vehicles travelled 182.1-182.N (block 802). A road segment may be a portion of a road, such as a particular mile on a highway (e.g., mile marker 35), a portion between consecutive traffic lights and/or intersections, a portion between consecutive landmarks, etc. The data for the road segment may include an indication of the condition of road segment and/or a particular location within the road segment. The data may be combined for the same road segment from each of the communications to generate an overall indication of the condition of the road segment (block 804). The overall indication of the condition of the road segment may include a recommendation to vehicles approaching the road segment. A request for vehicle data may be received from a mobile device 110 within a vehicle approaching the road segment (block 806). In response to the request, the overall indication of the condition of the road segment may be displayed via a user interface 202 of the mobile device 110 (block 808). For example, the overall indication of the condition of the road segment may be transmitted to the mobile device 110.

At block 802, the server 140 may receive communications from several autonomous vehicles 182.1-182.N, including data for the same road segment. A vehicle operator and/or owner of the autonomous vehicle 182.1-182.N may opt-in to share data with the server 140 and/or between autonomous vehicles 182.1-182.N. Each communication may include an indication of the location of the autonomous vehicle 182.1-182.N which transmitted the communication. For example, the indication may be a GPS location with precise GPS coordinates. In another example, the indication may be a name of the road segment, such as Route 90 at mile marker 26 or Main Street between the traffic light at the intersection of Main Street and North Avenue and the traffic light at the intersection of Main Street and Green Street. In yet another example, the indication may be a subsection of the road segment, such as the first half of mile marker 26.

Each communication may also include an indication of the condition of the road segment at the particular location. The indication of the condition of the road segment may include, for example the amount of wear and tear on the road segment including the number of potholes, cracks, ice patches on the road segment, whether the road segment is currently under construction, etc. Additionally, the indication of the condition of the road segment may include an amount of traffic at the particular location including whether a vehicle collision occurred at the particular location, and/or a maneuver to be performed by the corresponding vehicle at the particular location. The indication of the condition of the road segment may also include unexpected debris on the road segment including obstacles on the road segment such as fallen branches, a flooded area, rocks, fallen cargo, a portion of a shredded tire, broken glass or other large objects.

At block 804, the server 140 may analyze and/or combine the data for the same road segment received from the communications to generate an overall indication of the condition of the road segment. For example, indications of the condition of the road segment at particular locations within the road segment may be aggregated to determine an overall condition of the road segment. More specifically, when the first half of the road segment is in poor condition (e.g., having several potholes, cracks, etc.) and the second half of the road segment is in great condition (e.g., having newly paved cement), the server 140 may determine that the road segment overall is in average condition.

Additionally, the server 140 may aggregate several traffic reports from the communications to determine the total amount of traffic on the road segment. In some embodiments, the server 140 may determine the total amount of traffic for the road segment based upon an aggregation of traffic reports from the communications and/or indications of maneuvers to be performed by the vehicles on the road segment. For example, when several vehicles indicate that they are planning to exit or turn off the road segment at the next available exit, the server 140 may determine that the total amount of traffic on the road segment will decrease. Moreover, the server 140 may determine the number of vehicles on the road segment based upon the amount of communications regarding the road segment. In addition to the traffic reports received from the vehicles, the server 140 may also determine the total amount of traffic on the road segment based upon the number of vehicles on the road segment. The total amount of traffic may be provided as a category, such as "Heavy traffic," "Light traffic," "Medium traffic," etc. In another example, the total amount of traffic may be a numerical indication, such as the amount of additional time it will take to traverse the road segment (e.g., "3 additional minutes from mile 35 to mile 36 on Route 90.").

In some embodiments, the autonomous vehicles 182.1-182.N may generate traffic reports by communicating with smart infrastructure components 188 on the road segment. For example, a smart infrastructure component 188 may transmit traffic conditions on the road segment, construction on the road segment, a vehicle collision on the road segment, a number of vehicles on the road segment, etc., to the autonomous vehicles 182.1-182.N.

Also in some embodiments, the server 140 may assign weights to the data received from the communications based upon the time when each communication is sent. For example, data from communications sent more recently is weighted higher than data from communication sent earlier. More specifically, data from communication sent within a predetermined threshold time of the current time may be weighted higher than data from communications that were not sent within the predetermined threshold time of the current time. In this manner, when autonomous vehicles 182.1-182.N report vehicle collisions or traffic from hours or days earlier, the reported data is discounted because it is unlikely that the earlier vehicle collision or traffic still affects the current condition of the road segment. In such embodiments, some types of data may be weighted while other types may not be weighted and/or the predetermined threshold time for increasing or decreasing the assigned weight may differ based upon the type of data. For example, traffic data may be relevant within a short time window (e.g., 30 minutes, one hour, two hours, etc.), because traffic is constantly changing. Accordingly, current traffic data may be assigned a much higher weight than traffic data that is hours or days old. On other hand, construction data may be relevant for a long time period, because construction can last for weeks, months, or even years. As a result, current construction data may not be assigned a higher weight than construction data that is weeks or months old.

The overall condition of the road segment may also include a recommendation to vehicles approaching the road segment. The recommendation may be an action for the vehicles and/or vehicle operators to perform based upon the overall condition of the road segment. For example, when the overall condition of the road segment is very poor due to potholes, ice patches, unexpected debris on the road segment, cracks, etc., the server 140 may determine that autonomous vehicles 182.1-182.N in a manual mode should switch to an autonomous mode. This may be because the autonomous operation features have faster reaction times than vehicle operators for dealing with dangerous conditions, such as icy patches or big potholes. Accordingly, a vehicle operator may select a control within the autonomous vehicle 182.1-182.N to switch into the autonomous mode, enabling autonomous operation features. In other embodiments, the autonomous vehicle 182.1-182.N may automatically enable the autonomous operation features.

The recommendation may also be to switch into an autonomous mode when several autonomous vehicles 182.1-182.N on the same road and/or within a predetermined threshold distance of each other are travelling to the same destination. When the autonomous vehicles 182.1-182.N switch into the autonomous mode, they may form a platoon so that the autonomous vehicles 182.1-182.N may follow each other to the destination. In another example, the recommendation may be to switch from the autonomous mode to the manual mode. In some scenarios, operating in the manual mode may be safer than the autonomous mode.

At block 806, the server 140 may receive a request for vehicle data from a mobile device 110 within a vehicle approaching the road segment. The request may include an indication of the location of the mobile device 110 which may be compared to the location of the road segment. In some embodiments, the request may be provided from the Data Application. For example, the Data Application may include one or more user controls presented on a display 202 of the mobile device 110 which, when selected, cause the Data Application to transmit a request to the server 140 for vehicle data at the mobile device's current location.

In some embodiments, the server 140 may store vehicle data for several road segments within several roads over many cities, states, and/or countries. When a request for vehicle data is received from a mobile device 110, the server 140 may retrieve the vehicle data for the road segment corresponding to the mobile device's current location and/or any other location specified by the mobile device 110. For example, a user of the mobile device 110 may want to view traffic, construction, etc., for a future route.

At block 808, the server 140 may cause the overall indication of the condition of the road segment to be displayed on the mobile device 110. The overall indication of the condition of the road segment may be displayed via the Data Application. As mentioned above, the overall indication of the condition of the road segment may include an indication of an amount of wear and tear on the road segment including the number of potholes, cracks, or ice patches on the road segment, an indication of whether there is unexpected debris on the road segment, such as fallen branches, a flooded area, rocks, fallen cargo, a portion of a shredded tire, broken glass or other large objects, an indication of whether the road segment is currently under construction, an indication of an amount of traffic on the road segment, and/or indications of maneuvers to be performed by vehicles on the road segment. The overall indication of the road segment may also include a recommendation to the vehicle corresponding to the mobile device 110.

Each indication may be provided in a text format, such as "There is heavy traffic on Route 90," "Warning: construction on Main Street," "South Avenue is in poor condition," "Icy conditions on Route 66," etc. In additional or alternative embodiments, the indications may be symbolic and/or may be annotations overlaid on a map display. For example, a construction symbol may be displayed on a road segment within a map display. In another example, vehicle symbols and orientations of the corresponding vehicles may be displayed within the map display. The orientations may be based upon the maneuvers provided to the server 140 in the communications from the autonomous vehicles 182.1-182.N. Although the overall indication of the condition of the road segment is described as being displayed in a text or symbolic format for simplicity, the overall indication may be displayed in any suitable manner.

Additionally, the recommendation may be provided in a text format on the display 202 of the mobile device 110 and/or an audio format via the speakers of the mobile device 110. For example, when the recommendation is to switch from a manual mode into an autonomous mode, the mobile device 110 may display text including, "Please switch into the autonomous mode now." As a result, a vehicle operator may select a control within the autonomous vehicle 182.1-182.N to switch from the manual mode into the autonomous mode enabling autonomous operation features. In another example, the mobile device 110 may receive the recommendation and forward the recommendation onto the on-board computer 114. The on-board computer 114 may then generate a control command to automatically enable the autonomous operation features and switch into the autonomous mode.

Exemplary Methods of Determining Risk Using Telematics Data

As described herein, telematics data may be collected and used in monitoring, controlling, evaluating, and assessing risks associated with autonomous or semi-autonomous operation of a vehicle 108. In some embodiments, the Data Application installed on the mobile computing device 110 and/or on-board computer 114 may be used to collect and transmit data regarding vehicle operation. This data may include operating data regarding operation of the vehicle 108, autonomous operation feature settings or configurations, sensor data (including location data), data regarding the type or condition of the sensors 120, telematics data regarding vehicle regarding operation of the vehicle 108, environmental data regarding the environment in which the vehicle 108 is operating (e.g., weather, road, traffic, construction, or other conditions). Such data may be transmitted from the vehicle 108 or the mobile computing device 110 via radio links 183 (and/or via the network 130) to the server 140. The server 140 may receive the data directly or indirectly (i.e., via a wired or wireless link 183e to the network 130) from one or more vehicles 182 or mobile computing devices 184. Upon receiving the data, the server 140 may process the data to determine one or more risk levels associated with the vehicle 108.

In some embodiments, a plurality of risk levels associated with operation of the vehicle 108 may be determined based upon the received data, using methods similar to those discussed elsewhere herein, and a total risk level associated with the vehicle 108 may be determined based upon the plurality of risk levels. In other embodiments, the server 140 may directly determine a total risk level based upon the received data. Such risk levels may be used for vehicle navigation, vehicle control, control hand-offs between the vehicle and driver, settings adjustments, driver alerts, accident avoidance, insurance policy generation or adjustment, and/or other processes as described elsewhere herein.

In some aspects, computer-implemented methods for monitoring the use of a vehicle 108 having one or more autonomous operation features and/or adjusting an insurance policy associated with the vehicle 108 may be provided. In some embodiments, the mobile computing device 110 and/or on-board computer 114 may have a Data Application installed thereon, as described above. Such Data Application may be executed by one or more processors of the mobile computing device 110 and/or on-board computer 114 to, with the customer's permission or affirmative consent, collect the sensor data, determine the telematics data, receive the feature use levels, and transmit the information to the remote server 140. The Data Application may similarly perform or cause to be performed any other functions or operations described herein as being controlled by the mobile computing device 110 and/or on-board computer 114.

The telematics data may include data regarding one or more of the following regarding the vehicle 108: acceleration, braking, speed, heading, and/or location. The telematics data may further include information regarding one or more of the following: time of day of vehicle operation, road conditions in a vehicle environment in which the vehicle is operating, weather conditions in the vehicle environment, and/or traffic conditions in the vehicle environment. In some embodiments, the one or more sensors 120 of the mobile computing device 110 may include one or more of the following sensors disposed within the mobile computing device 110: an accelerometer array, a camera, a microphone, and/or a geolocation unit (e.g., a GPS receiver). In further embodiments, one or more of the sensors 120 may be communicatively connected to the mobile computing device 110 (such as through a wireless communication link).

The feature use levels may be received by the mobile computing device 110 from the on-board computer 114 via yet another radio link 183 between the mobile computing device 110 and the on-board computer 114, such as link 116. The feature use levels may include data indicating adjustable settings for at least one of the one or more autonomous operation features. Such adjustable settings may affect operation of the at least one of the one or more autonomous operation features in controlling an aspect of vehicle operation, as described elsewhere herein.

In some embodiments, the method may further including receiving environmental information regarding the vehicle's environment at the mobile computing device 110 and/or on-board computer 114 via another radio link 183 or wireless communication channel. Such environmental information may also be transmitted to the remote server 140 via the radio link 183 and may be used by the remote server 140 in determining the total risk level. In some embodiments, the remote server 140 may receive part or all of the environmental information through the network 130 from sources other than the mobile computing device 110 and/or on-board computer 114. Such sources may include third-party data sources, such as weather or traffic information services. The environmental data may include one or more of the following: road conditions, weather conditions, nearby traffic conditions, type of road, construction conditions, location of pedestrians, movement of pedestrians, movement of other obstacles, signs, traffic signals, or availability of autonomous communications from external sources. The environmental data may similarly include any other data regarding a vehicle environment described elsewhere herein.

In further embodiments, the method may include collecting additional telematics data and/or information regarding feature use levels at a plurality of additional mobile computing devices 184 associated with a plurality of additional vehicles 182. Such additional telematics data and/or information regarding feature use levels may be transmitted from the plurality of additional mobile computing devices 184 to the remote server 140 via a plurality of radio links 183 and received at one or more processors of the remote server 140. The remote server 140 may further base the determination of the total risk level at least in part upon the additional telematics data and/or feature use levels. Some embodiments of the methods described herein may include determining, adjusting, generating, rating, or otherwise performing actions necessary for creating or updating an insurance policy associated with the vehicle 108.

Autonomous Vehicle Insurance Policies

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle.

The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration's.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals.

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Autonomous Automobile Insurance

Some aspects of some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation). Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations. Results from both the test environment and/or actual insurance losses may be compared to the results of other autonomous software packages and/or vehicles lacking autonomous operation features to determine relative risk levels or risk factors for one or more autonomous operation features. To determine such risk levels or factors, the control decisions generated by autonomous operation features may be assessed to determine the degree to which actual or shadow control decisions are expected to succeed in avoiding or mitigating vehicle accidents. This risk levels or factors may be applicable to other vehicles that utilize the same or similar autonomous operation features and may, in some embodiments, be applied to vehicle utilizing similar features (such as other software versions), which may require adjustment for differences between the features.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof. In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as time of day, weather conditions, traffic congestion, interaction between autonomous operation features, or other such variables that influence the risks associated with autonomous or semi-autonomous vehicle operation.

Some embodiments described herein may include automated machine learning to determine risk levels, identify relevant risk factors, optimize autonomous or semi-autonomous operation, optimize routes, determine autonomous operation feature effectiveness, predict user demand for a vehicle, determine vehicle operator or passenger illness or injury, evaluate sensor operating status, predict sensor failure, evaluate damage to a vehicle, predict repairs to a vehicle, predict risks associated with manual vehicle operation based upon the driver and environmental conditions, recommend optimal or preferred autonomous operation feature usage, estimate risk reduction or cost savings from feature usage changes, determine when autonomous operation features should be engaged or disengaged, determine whether a driver is prepared to resume control of some or all vehicle operations, and/or determine other events, conditions, risks, or actions as described elsewhere herein. Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as autonomous vehicle system, feature, or sensor data, autonomous vehicle system control signal data, vehicle-mounted sensor data, mobile device sensor data, and/or telematics, image, or radar data) in order to facilitate making predictions for subsequent data (again, such as autonomous vehicle system, feature, or sensor data, autonomous vehicle system control signal data, vehicle-mounted sensor data, mobile device sensor data, and/or telematics, image, or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or control signal data, and other data discuss herein. The machine learning programs may utilize deep learning algorithms primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by the autonomous systems or sensors, and under what conditions those control signals were generated by the autonomous systems or sensors.

The machine learning programs may be trained with autonomous system data, autonomous sensor data, and/or vehicle-mounted or mobile device sensor data to identify actions taken by the autonomous vehicle before, during, and/or after vehicle collisions; identify who was behind the wheel of the vehicle (whether actively driving, or riding along as the autonomous vehicle autonomously drove); identify actions taken by the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insured parties after an insurance-related event.

The machine learning programs may be trained with autonomous system data, autonomous vehicle sensor data, and/or vehicle-mounted or mobile device sensor data to identify preferred (or recommended) and actual control signals relating to or associated with, for example, whether to apply the brakes; how quickly to apply the brakes; an amount of force or pressure to apply the brakes; how much to increase or decrease speed; how quickly to increase or decrease speed; how quickly to accelerate or decelerate; how quickly to change lanes or exit; the speed to take while traversing an exit or entrance ramp; at what speed to approach a stop sign or light; how quickly to come to a complete stop; and/or how quickly to accelerate from a complete stop.

After training, machine learning programs (or information generated by such machine learning programs) may be used to evaluate additional data. Such data may be related to tests of new autonomous operation feature or versions thereof, actual operation of an autonomous vehicle, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, thus, be used to perform part or all of the analytical functions of the methods described elsewhere herein.

Other Matters

In some aspect, customers may opt-in to a rewards, loyalty, or other program. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact.

The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for presenting vehicle data for a road segment based upon data collected from a plurality of vehicles each having one or more autonomous operation features, comprising:
   receiving, at one or more processors, a plurality of communications from a plurality of vehicles each having one or more autonomous operation features, wherein each of the plurality of communications includes data corresponding to a same road segment on which the plurality of vehicles travelled, and wherein the data includes an indication of a location within the road segment and an indication of a condition of the road segment at the location;
   combining, by the one or more processors, the data for the same road segment from the plurality of communications to generate an overall indication of the condition of the road segment, wherein the overall indication includes a recommendation to vehicles approaching the road segment;
   receiving, by the one or more processors, a request to display vehicle data including the overall indication for the road segment from a mobile device within a vehicle approaching the road segment; and
   causing, by the one or more processors, the overall indication for the road segment to be displayed on a user interface of the mobile device.

2. The computer-implemented method of claim 1, wherein the overall indication of the condition of the road segment includes a recommendation to change vehicle operation from a manual mode to an autonomous mode, and in response to receiving the recommendation the vehicle having the mobile device switches to an autonomous mode or the overall indication of the condition of the road segment includes a recommendation to change vehicle operation from the autonomous mode to the manual mode, and in response to receiving the recommendation the vehicle having the mobile device switches to the manual mode.

3. The computer-implemented method of claim 1, wherein the recommendation includes an action for the vehicle having the mobile device to perform based upon the overall indication of the condition of the road segment.

4. The computer-implemented method of claim 1, wherein the plurality of vehicles obtain the data corresponding to the road segment from a smart infrastructure component.

5. The computer-implemented method of claim 1, wherein an indication of the condition of the road segment at the location includes at least one of: (i) traffic at the road segment, (ii) a maneuver to be performed by each vehicle of the plurality of vehicles at the location, (iii) an amount of wear and tear on the road segment, (iv) whether the road segment is currently under construction, or (v) unexpected debris on the road segment.

6. The computer-implemented method of claim 5, wherein the traffic at the road segment includes: an indication of a vehicle collision on the road segment, an indication of construction occurring on the road segment, a number of vehicles on the road segment, or a number of vehicles planning to exit the road segment;

wherein the amount of wear and tear on the road segment includes at least one of: a number of potholes on the road segment, one or more ice patches on the road segment, or one or more cracks in the road segment; and wherein unexpected debris on the road segment includes at least one of: a fallen branch on the road segment, a flooded portion of the road segment, a rock on the road segment, fallen cargo on the road segment, a portion of a shredded tire on the road segment, or broken glass on the road segment.

7. The computer-implemented method of claim 1, wherein combining the data for the same road segment from the plurality of communications to generate an overall indication of the condition of the road segment includes:

assigning, by the one or more processors, a weight to the data from each communication based upon the time when the communication is sent, wherein data from communications sent more recently is weighted higher than data from communications sent earlier; and combining, by the one or more processors, the weighted data for the same road segment to generate the overall indication of the road segment.

8. A computer system configured to present vehicle data for a road segment based upon data collected from a plurality of vehicles each having one or more autonomous operation features, the computer system comprising one or more local or remote processors, transceivers, and/or sensors configured to:

receive a plurality of communications from a plurality of vehicles each having one or more autonomous operation features, wherein each of the plurality of communications includes data corresponding to a same road segment on which the plurality of vehicles travelled, and wherein the data includes an indication of a location within the road segment and an indication of a condition of the road segment at the location;

combine the data for the same road segment from the plurality of communications to generate an overall indication of the condition of the road segment, wherein the overall indication includes a recommendation to vehicles approaching the road segment;

receive a request to display vehicle data including the overall indication for the road segment from a mobile device within a vehicle approaching the road segment; and cause the overall indication for the road segment to be displayed on a user interface of the mobile device.

9. The computer system of claim 8, wherein the overall indication of the condition of the road segment includes a recommendation to change vehicle operation from a manual mode to an autonomous mode, and in response to receiving the recommendation the vehicle having the mobile device switches to an autonomous mode or the overall indication of the condition of the road segment includes a recommendation to change vehicle operation from the autonomous mode to the manual mode, and in response to receiving the recommendation the vehicle having the mobile device switches to the manual mode.

10. The computer system of claim 8, wherein the recommendation includes an action for the vehicle having the mobile device to perform based upon the overall indication of the condition of the road segment.

11. The computer system of claim 8, wherein the plurality of vehicles obtain the data corresponding to the road segment from a smart infrastructure component.

12. The computer system of claim 8, wherein an indication of the condition of the road segment at the location includes at least one of: (i) traffic at the road segment, (ii) a maneuver to be performed by each vehicle of the plurality of vehicles at the location, (iii) an amount of wear and tear on the road segment, (iv) whether the road segment is currently under construction, or (v) unexpected debris on the road segment.

13. The computer system of claim 12, wherein the traffic at the road segment includes: an indication of a vehicle collision on the road segment, an indication of construction occurring on the road segment, a number of vehicles on the road segment, or a number of vehicles planning to exit the road segment;

wherein the amount of wear and tear on the road segment includes at least one of: a number of potholes on the road segment, one or more ice patches on the road segment, or one or more cracks in the road segment; and wherein unexpected debris on the road segment includes at least one of: a fallen branch on the road segment, a flooded portion of the road segment, a rock on the road segment, fallen cargo on the road segment, a portion of a shredded tire on the road segment, or broken glass on the road segment.

14. The computer system of claim 8, wherein to combine the data for the same road segment from the plurality of communications to generate an overall indication of the condition of the road segment, the one or more local or remote processors, transceivers, and/or sensors are configured to:

assign a weight to the data from each communication based upon the time when the communication is sent, wherein data from communications sent more recently is weighted higher than data from communications sent earlier; and combine the weighted data for the same road segment to generate the overall indication of the road segment.

15. A non-transitory computer-readable medium storing thereon a set of instructions that, when executed on one or more processors, causes the one or more processors to:

receive a plurality of communications from a plurality of vehicles each having one or more autonomous operation features, wherein each of the plurality of communications include data corresponding to a same road segment on which the plurality of vehicles travelled, and wherein the data includes an indication of a location within the road segment and an indication of a condition of the road segment at the location;

combine the data for the same road segment from the plurality of communications to generate an overall indication of the condition of the road segment, wherein the overall indication includes a recommendation to vehicles approaching the road segment;

receive a request to display vehicle data including the overall indication for the road segment from a mobile device within a vehicle approaching the road segment; and cause the overall indication for the road segment to be displayed on a user interface of the mobile device.

16. The computer-readable medium of claim 15, wherein the overall indication of the condition of the road segment includes a recommendation to change vehicle operation from a manual mode to an autonomous mode, and in response to receiving the recommendation the vehicle having the mobile device switches to an autonomous mode or the overall indication of the condition of the road segment includes a recommendation to change vehicle operation from the autonomous mode to the manual mode, and in response to receiving the recommendation the vehicle having the mobile device switches to the manual mode.

17. The computer-readable medium of claim 15, wherein the recommendation includes an action for the vehicle having the mobile device to perform based upon the overall indication of the condition of the road segment.

18. The computer-readable medium of claim 15, wherein an indication of the condition of the road segment at the location includes at least one of: (i) traffic at the road segment, (ii) a maneuver to be performed by each vehicle of the plurality of vehicles at the location, (iii) an amount of wear and tear on the road segment, (iv) whether the road segment is currently under construction, or (v) unexpected debris on the road segment.

19. The computer-readable medium of claim 18, wherein the traffic at the road segment includes: an indication of a vehicle collision on the road segment, an indication of construction occurring on the road segment, a number of vehicles on the road segment, or a number of vehicles planning to exit the road segment;
wherein the amount of wear and tear on the road segment includes at least one of: a number of potholes on the road segment, one or more ice patches on the road segment, or one or more cracks in the road segment; and wherein unexpected debris on the road segment includes at least one of: a fallen branch on the road segment, a flooded portion of the road segment, a rock on the road segment, fallen cargo on the road segment, a portion of a shredded tire on the road segment, or broken glass on the road segment.

20. The computer-readable medium of claim 15, wherein to combine the data for the same road segment from the plurality of to generate an overall indication of the condition of the road segment, the set of instructions causes the one or more processors to:

assign a weight to the data from each communication based upon the time when the communication is sent, wherein data from communications sent more recently is weighted higher than data from communications sent earlier; and combine the weighted data for the same road segment to generate the overall indication of the road segment.

* * * * *